US012648501B2

(12) United States Patent
Eichhorn et al.

(10) Patent No.: US 12,648,501 B2
(45) Date of Patent: Jun. 9, 2026

(54) PLANTER DOWNFORCE AND UPLIFT MONITORING AND CONTROL FEEDBACK DEVICES, SYSTEMS AND ASSOCIATED METHODS

(71) Applicant: Ag Leader Technology, Ames, IA (US)

(72) Inventors: Scott Eichhorn, Ames, IA (US); Tony Woodcock, Ames, IA (US); Brett Buehler, Dallas Center, IA (US); Steven Brown, Ames, IA (US); Roger Zielke, Huxley, IA (US); Bob Heston, Madrid, IA (US)

(73) Assignee: Ag Leader Technology, Ames, IA (US)

( * ) Notice: Subject to any disclaimer, the term of this patent is extended or adjusted under 35 U.S.C. 154(b) by 936 days.

(21) Appl. No.: 17/552,733

(22) Filed: Dec. 16, 2021

(65) Prior Publication Data

US 2022/0142039 A1 May 12, 2022

Related U.S. Application Data

(62) Division of application No. 16/142,522, filed on Sep. 26, 2018, now abandoned.

(Continued)

(51) Int. Cl.
*A01B 63/16* (2006.01)
*A01B 63/00* (2006.01)
(Continued)

(52) U.S. Cl.
CPC ............ *A01B 63/16* (2013.01); *A01B 63/008* (2013.01); *A01B 63/111* (2013.01); *A01B 63/24* (2013.01);
(Continued)

(58) Field of Classification Search
CPC ......... A01B 63/16; A01B 63/14; A01B 63/00; A01B 63/008; A01B 63/111; A01B 63/24;
(Continued)

(56) References Cited

U.S. PATENT DOCUMENTS 54,633 A     5/1866  Wilkinson
605,348 A    6/1898  Schultz
(Continued)

FOREIGN PATENT DOCUMENTS

AU    2006203367 A1    2/2007
AU    2010201330 A1    3/2011
(Continued)

OTHER PUBLICATIONS

8910 Floating Hitch Cultivator, available as early as 2010—https://www.bourgault.com/en-us/products/tillage/8910-cultivator.
(Continued)

*Primary Examiner* — Christopher J. Novosad
(74) *Attorney, Agent, or Firm* — DENTONS DAVIS BROWN PC; Matthew Warner-Blankenship; Kassandra Ricklefs

(57) ABSTRACT

On-the-go monitoring and controlled feedback in supplemental downforce applications. The system provides real-time monitoring of furrow depth via contact and non-contact approaches, some of which are combined with gauge wheel feedback to calibrate and otherwise control the application of supplemental downforce to the row unit. A combination of sensor types are employed in collecting furrow depth measurements, which can be used to adjust the supplemental downforce through a control system module. A gauge wheel load sensor may be used to modify the application of supplemental downforce.

20 Claims, 23 Drawing Sheets

Related U.S. Application Data

(60) Provisional application No. 62/632,288, filed on Feb. 19, 2018.

(51) Int. Cl.

| | |
|---|---|
| A01B 63/111 | (2006.01) |
| A01B 63/24 | (2006.01) |
| A01C 5/06 | (2006.01) |
| A01C 7/08 | (2006.01) |
| A01C 7/20 | (2006.01) |
| G01B 11/22 | (2006.01) |
| G01B 21/18 | (2006.01) |
| G01D 5/14 | (2006.01) |

(52) U.S. Cl.
CPC ............... *A01C 5/064* (2013.01); *A01C 7/08* (2013.01); *A01C 7/203* (2013.01); *A01C 7/205* (2013.01); *G01B 11/22* (2013.01); *G01B 21/18* (2013.01); *G01D 5/14* (2013.01); *A01C 5/068* (2013.01); *A01C 7/206* (2013.01)

(58) Field of Classification Search
CPC ....... A01B 63/002; A01B 63/10; A01B 63/02; A01C 5/064; A01C 7/08; A01C 7/203; A01C 7/205; A01C 5/062; A01C 5/06; A01C 5/00; A01C 7/00; A01C 7/201; A01C 7/20; A01C 5/068; A01C 7/206; G01B 11/22; G01B 21/18; G01B 11/00; G01B 21/00; G01D 5/14; G01D 5/12; G01D 5/00
See application file for complete search history.

(56) References Cited

U.S. PATENT DOCUMENTS

| | | | |
|---|---|---|---|
| 1,178,765 A | 4/1916 | Waterman |
| 1,252,923 A | 1/1918 | Moench |
| 1,678,643 A | 7/1928 | Kassebeer |
| 1,731,356 A | 10/1929 | Smith |
| 2,357,760 A | 9/1944 | Peacock |
| 2,525,435 A | 10/1950 | White |
| 3,233,523 A | 2/1966 | Passaggio |
| 3,463,010 A | 8/1969 | Hatschek |
| 3,509,837 A | 5/1970 | Erickson |
| 3,718,191 A | 2/1973 | Williams |
| 3,749,035 A | 7/1973 | Cayton |
| 3,797,418 A | 3/1974 | Bridger |
| 3,844,357 A | 10/1974 | Ellinger |
| 4,116,139 A | 9/1978 | Sauer |
| 4,167,910 A | 9/1979 | Pretzer |
| 4,193,458 A | 3/1980 | Long |
| 4,209,109 A | 6/1980 | Curl |
| 4,329,911 A | 5/1982 | Schwerin |
| 4,359,104 A | 11/1982 | Haapala |
| 4,417,530 A | 11/1983 | Kopecky |
| 4,596,200 A | 6/1986 | Gafford |
| 4,646,663 A | 3/1987 | Nikkel |
| 4,655,296 A | 4/1987 | Bourgault |
| 4,700,785 A | 10/1987 | Bartusek |
| 4,765,423 A | 8/1988 | Karpa |
| 4,796,550 A | 1/1989 | Van Natta |
| 4,865,132 A | 9/1989 | Moore |
| 4,878,443 A | 11/1989 | Gardner |
| 4,913,070 A | 4/1990 | Morrison |
| 4,949,656 A | 8/1990 | Lyle |
| 4,986,782 A | 1/1991 | Severtson |
| 5,065,681 A | 11/1991 | Hadley |
| 5,069,779 A | 12/1991 | Brown |
| 5,074,227 A | 12/1991 | Schwitters |
| 5,103,924 A | 4/1992 | Walker |
| 5,163,518 A | 11/1992 | Foley |
| 5,170,909 A | 12/1992 | Lundie |
| 5,234,060 A | 8/1993 | Carter |

| | | | |
|---|---|---|---|
| 5,277,257 A | 1/1994 | Thompson |
| 5,366,024 A | 11/1994 | Payne |
| 5,425,318 A | 6/1995 | Keeton |
| 5,427,182 A | 6/1995 | Winter |
| 5,479,992 A | 1/1996 | Bassett |
| 5,497,837 A | 3/1996 | Kehrney |
| 5,499,683 A | 3/1996 | Bassett |
| 5,529,128 A | 6/1996 | Peterson |
| 5,664,507 A | 9/1997 | Bergland |
| 5,709,271 A | 1/1998 | Bassett |
| 5,829,535 A | 11/1998 | Line |
| 5,842,428 A | 12/1998 | Stufflebeam et al. |
| 5,862,764 A | 1/1999 | Umemoto |
| 5,936,234 A | 8/1999 | Thomas |
| 5,961,573 A | 10/1999 | Hale |
| 6,003,455 A | 12/1999 | Flamme |
| 6,013,020 A | 1/2000 | Meloul |
| 6,068,063 A | 5/2000 | Mayerle |
| 6,068,064 A | 5/2000 | Bettin |
| 6,091,997 A | 7/2000 | Flamme |
| 6,116,172 A | 9/2000 | Prairie |
| 6,119,608 A | 9/2000 | Peterson |
| 6,325,156 B1 | 12/2001 | Barry |
| 6,378,619 B2 | 4/2002 | Mayerle |
| 6,389,999 B1 | 5/2002 | Duello |
| 6,460,623 B1 | 10/2002 | Knussman |
| 6,681,706 B2 | 1/2004 | Sauder et al. |
| 6,701,857 B1 | 3/2004 | Jensen |
| 6,748,885 B2 | 6/2004 | Sauder et al. |
| 6,827,029 B1 | 12/2004 | Wendte |
| 6,863,006 B2 | 3/2005 | Sandoval |
| 7,004,090 B2 | 2/2006 | Swanson |
| 7,131,384 B2 | 11/2006 | Kester |
| 7,263,937 B2 | 9/2007 | Frasier |
| 7,334,532 B2 | 2/2008 | Sauder et al. |
| 7,395,767 B2 | 7/2008 | Sulman |
| 7,395,769 B2 | 7/2008 | Jensen |
| 7,478,603 B2 | 1/2009 | Riewerts |
| 7,493,836 B2 | 2/2009 | Wolfer |
| 7,540,246 B2 | 6/2009 | Friesen |
| 7,584,707 B2 | 9/2009 | Sauder |
| 7,673,570 B1 | 3/2010 | Bassett |
| 7,694,638 B1 | 4/2010 | Riewerts |
| 7,699,009 B2 | 4/2010 | Sauder et al. |
| 7,717,048 B2 | 5/2010 | Peterson, Jr. et al. |
| 7,870,826 B2 | 1/2011 | Bourgault |
| 7,938,074 B2 | 5/2011 | Liu |
| 7,980,186 B2 | 7/2011 | Henry |
| 8,020,657 B2 | 9/2011 | Allard |
| 8,056,465 B2 | 11/2011 | Carlz |
| 8,078,367 B2 | 12/2011 | Sauder |
| 8,201,507 B2 | 6/2012 | Sauder |
| 8,275,525 B2 | 9/2012 | Kowalchuk |
| 8,275,627 B2 | 9/2012 | Henning |
| 8,286,566 B2 | 10/2012 | Schilling |
| 8,342,258 B2 | 1/2013 | Ryder |
| 8,346,442 B2 | 1/2013 | Ryder |
| 8,371,239 B2 | 2/2013 | Rans et al. |
| 8,418,636 B2 | 4/2013 | Liu et al. |
| 8,430,179 B2 | 4/2013 | Van Buskirk |
| 8,448,587 B2 | 5/2013 | Kowalchuk |
| 8,448,717 B2 | 5/2013 | Adams et al. |
| 8,451,449 B2 | 5/2013 | Holland |
| 8,479,671 B2 | 7/2013 | Shoup |
| 8,522,889 B2 | 9/2013 | Adams et al. |
| 8,544,397 B2 | 10/2013 | Bassett |
| 8,544,398 B2 | 10/2013 | Bassett |
| 8,550,020 B2 | 10/2013 | Sauder et al. |
| 8,561,472 B2 | 10/2013 | Sauder et al. |
| 8,573,111 B2 | 11/2013 | Graham |
| 8,634,992 B2 | 1/2014 | Sauder et al. |
| 8,636,077 B2 | 1/2014 | Bassett |
| 8,755,049 B2 | 6/2014 | Holland |
| 8,763,713 B2 | 7/2014 | Bassett |
| 8,770,308 B2 | 7/2014 | Bassett |
| 8,776,702 B2 | 7/2014 | Bassett |
| RE45,091 E | 8/2014 | Bassett |
| 8,814,474 B2 | 8/2014 | Bell |
| 8,850,998 B2 | 10/2014 | Garner |

(56) References Cited

U.S. PATENT DOCUMENTS

| | | | |
|---|---|---|---|
| 8,863,857 | B2 | 10/2014 | Bassett |
| 8,903,545 | B2 | 12/2014 | Riffel |
| 8,909,436 | B2 | 12/2014 | Achen |
| 8,910,582 | B2 | 12/2014 | Mariman et al. |
| 8,924,092 | B2 | 12/2014 | Achen |
| 8,924,102 | B2 | 12/2014 | Sauder et al. |
| RE45,412 | E | 3/2015 | Sauder et al. |
| 8,978,564 | B2 | 3/2015 | Hagny |
| 8,985,037 | B2 | 3/2015 | Radtke |
| 8,985,232 | B2 | 3/2015 | Bassett |
| 9,055,712 | B2 | 6/2015 | Bassett |
| 9,107,337 | B2 | 8/2015 | Bassett |
| 9,107,338 | B2 | 8/2015 | Bassett |
| 9,113,589 | B2 | 8/2015 | Bassett |
| 9,119,342 | B2 | 9/2015 | Bonefas |
| 9,137,938 | B2 | 9/2015 | Zimmerman |
| 9,144,187 | B2 | 9/2015 | Bassett |
| 9,144,189 | B2 | 9/2015 | Stoller |
| 9,167,740 | B2 | 10/2015 | Bassett |
| 9,173,339 | B2 | 11/2015 | Sauder et al. |
| 9,192,089 | B2 | 11/2015 | Bassett |
| 9,213,905 | B2 | 12/2015 | Lange |
| 9,226,440 | B2 | 1/2016 | Bassett |
| 9,232,687 | B2 | 1/2016 | Bassett |
| 9,265,191 | B2 | 2/2016 | Sauder et al. |
| 9,288,937 | B2 | 3/2016 | Sauder et al. |
| 9,301,438 | B2 | 4/2016 | Sauder et al. |
| 9,332,689 | B2 | 5/2016 | Baurer |
| 9,338,937 | B2 | 5/2016 | Sauder et al. |
| 9,351,440 | B2 | 5/2016 | Sauder et al. |
| 9,462,744 | B2 | 10/2016 | Isaacson |
| 9,485,900 | B2 | 11/2016 | Connell |
| 9,510,498 | B2 | 12/2016 | Tuttle et al. |
| 9,523,496 | B2 | 12/2016 | Bingham |
| 9,532,496 | B2 | 1/2017 | Sauder et al. |
| 9,554,504 | B2 | 1/2017 | Houck |
| 9,578,802 | B2 | 2/2017 | Radtke |
| 9,585,301 | B1 | 3/2017 | Lund |
| 9,629,304 | B2 | 4/2017 | Zielke |
| 9,668,402 | B2 | 6/2017 | Hagny |
| 9,675,004 | B2 | 6/2017 | Landphair et al. |
| 9,681,601 | B2 | 6/2017 | Bassett |
| 9,693,496 | B2 | 7/2017 | Tevs |
| 9,699,958 | B2 | 7/2017 | Koch |
| 9,723,778 | B2 | 8/2017 | Bassett |
| 9,746,007 | B1 | 8/2017 | Stoller |
| 9,750,174 | B2 | 9/2017 | Sauder et al. |
| 9,752,596 | B2 | 9/2017 | Sauder |
| 9,788,472 | B2 | 10/2017 | Bassett |
| 9,801,332 | B2 | 10/2017 | Landphair |
| 9,814,172 | B2 | 11/2017 | Achen et al. |
| 9,848,522 | B2 | 12/2017 | Bassett |
| 9,848,523 | B2 | 12/2017 | Sauder |
| 9,854,733 | B1 | 1/2018 | Kile |
| 9,879,702 | B2 | 1/2018 | Stoller |
| 9,955,623 | B2 | 5/2018 | Sauder et al. |
| 9,968,033 | B2 | 5/2018 | Dunn |
| 10,045,477 | B2 | 8/2018 | Hagny |
| 10,064,322 | B2 | 9/2018 | Luc |
| 10,091,926 | B2 | 10/2018 | Maro |
| 10,104,830 | B2 | 10/2018 | Heathcote |
| 10,111,415 | B2 | 10/2018 | Kolb |
| 10,143,128 | B2 | 12/2018 | Landphair et al. |
| 10,231,376 | B1 | 3/2019 | Stanhope |
| 10,257,973 | B2 | 4/2019 | Hubner |
| 10,408,670 | B2 | 9/2019 | Holcomb |
| 10,548,259 | B2 | 2/2020 | Heathcote |
| 10,609,857 | B2 | 4/2020 | Sauder |
| 10,645,865 | B2 | 5/2020 | Bassett |
| 10,821,829 | B2 | 11/2020 | Foster |
| 10,959,369 | B2 | 3/2021 | Sieling |
| 11,144,775 | B2 | 10/2021 | Ferrari |
| 11,197,411 | B2 | 12/2021 | Bassett |
| 11,202,404 | B2 | 12/2021 | Walter |
| 11,212,954 | B2 | 1/2022 | Maeder |
| 11,277,961 | B2 | 3/2022 | Campbell |
| 11,612,096 | B2 | 3/2023 | Sivinski |
| 11,622,494 | B2 | 4/2023 | Arnett et al. |
| 11,672,195 | B2 | 6/2023 | Stoller |
| 12,075,719 | B2 | 9/2024 | Strnad |
| 12,158,388 | B2 | 12/2024 | Yelle |
| 2002/0056407 | A1 | 5/2002 | Milne |
| 2002/0073678 | A1 | 6/2002 | Lucand |
| 2003/0005867 | A1 | 1/2003 | Richard |
| 2003/0183141 | A1 | 10/2003 | Bergere et al. |
| 2004/0139895 | A1 | 7/2004 | Thompson et al. |
| 2005/0155536 | A1 | 7/2005 | Wendte |
| 2005/0172873 | A1 | 8/2005 | Mayerle |
| 2005/0263049 | A1 | 12/2005 | Summach |
| 2006/0086295 | A1 | 4/2006 | Jensen |
| 2008/0110382 | A1 | 5/2008 | Brockmeier |
| 2008/0229986 | A1 | 9/2008 | Arksey |
| 2008/0257237 | A1 | 10/2008 | Friesen |
| 2009/0056531 | A1 | 3/2009 | Jessen |
| 2009/0056537 | A1 | 3/2009 | Jessen |
| 2009/0112410 | A1 | 4/2009 | Shull |
| 2010/0180808 | A1 | 7/2010 | Liu |
| 2010/0192818 | A1 | 8/2010 | Gamer |
| 2010/0270043 | A1 | 10/2010 | Ankenman |
| 2010/0319941 | A1 | 12/2010 | Peterson |
| 2011/0027479 | A1 | 2/2011 | Reineccius |
| 2011/0313575 | A1 | 12/2011 | Kowalchuk |
| 2012/0042813 | A1 | 2/2012 | Liu et al. |
| 2012/0046838 | A1 | 2/2012 | Landphair et al. |
| 2012/0048159 | A1 | 3/2012 | Adams et al. |
| 2012/0048160 | A1 | 3/2012 | Adams |
| 2012/0151910 | A1 | 6/2012 | Sauder |
| 2012/0186503 | A1 | 7/2012 | Sauder |
| 2012/0261149 | A1 | 10/2012 | Schmidt |
| 2012/0291680 | A1 | 11/2012 | Rylander |
| 2013/0032363 | A1 | 2/2013 | Curry et al. |
| 2013/0126430 | A1 | 5/2013 | Kenley |
| 2013/0248212 | A1 | 9/2013 | Bassett |
| 2013/0333601 | A1 | 12/2013 | Shivak |
| 2014/0026748 | A1 | 1/2014 | Stoller |
| 2014/0060869 | A1 | 3/2014 | Blunier |
| 2014/0109808 | A1 | 4/2014 | Schilling |
| 2014/0116735 | A1 | 5/2014 | Bassett |
| 2014/0190712 | A1 | 7/2014 | Bassett |
| 2014/0214284 | A1 | 7/2014 | Sauder et al. |
| 2014/0216771 | A1 | 8/2014 | Bassett |
| 2014/0238284 | A1 | 8/2014 | Kapphahn |
| 2014/0262378 | A1 | 9/2014 | Connors |
| 2014/0303854 | A1 | 10/2014 | Zielke |
| 2014/0379230 | A1 | 12/2014 | Koch |
| 2015/0094916 | A1 | 4/2015 | Bauerer et al. |
| 2015/0107501 | A1 | 4/2015 | Barton |
| 2015/0176614 | A1 | 6/2015 | Stoller |
| 2015/0195988 | A1 | 7/2015 | Radtke |
| 2015/0264857 | A1 | 9/2015 | Achen |
| 2015/0271986 | A1 | 10/2015 | Sauder |
| 2015/0305229 | A1 | 10/2015 | Sauder |
| 2015/0319919 | A1 | 11/2015 | Sauder |
| 2016/0007521 | A1 | 1/2016 | Kusler |
| 2016/0007524 | A1 | 1/2016 | Kusler |
| 2016/0040692 | A1 | 2/2016 | Stoller |
| 2016/0128272 | A1 | 5/2016 | Sauder |
| 2016/0143213 | A1 | 5/2016 | Kowalchuk |
| 2016/0157412 | A1 | 6/2016 | Sauder |
| 2016/0212932 | A1 | 7/2016 | Radtke |
| 2016/0227700 | A1 | 8/2016 | Wendte |
| 2016/0227701 | A1 | 8/2016 | Nelson |
| 2016/0249525 | A1 | 9/2016 | Baurer et al. |
| 2017/0000016 | A1 | 1/2017 | Prickel |
| 2017/0013771 | A1 | 1/2017 | Townsend |
| 2017/0049044 | A1 | 2/2017 | Stoller |
| 2017/0086347 | A1 | 3/2017 | Sauder |
| 2017/0094889 | A1 | 4/2017 | Garner |
| 2017/0112043 | A1 | 4/2017 | Nair |
| 2017/0223947 | A1 | 8/2017 | Gall |
| 2017/0280616 | A1 | 10/2017 | Gervais |
| 2017/0354079 | A1 | 12/2017 | Foster |
| 2017/0357029 | A1 | 12/2017 | Lakshmanan |
| 2017/0359941 | A1 | 12/2017 | Czapka |

(56)                    References Cited

U.S. PATENT DOCUMENTS

| | | |
|---|---|---|
| 2017/0367252 A1 | 12/2017 | Sakaguchi |
| 2018/0015490 A1 | 1/2018 | Grimm |
| 2018/0024549 A1 | 1/2018 | Hurd |
| 2018/0092287 A1 | 4/2018 | Garner |
| 2018/0092288 A1 | 4/2018 | Garner |
| 2018/0092289 A1 | 4/2018 | Wonderlich |
| 2018/0092295 A1 | 4/2018 | Sugumaran |
| 2018/0125000 A1 | 5/2018 | Levy |
| 2018/0128933 A1 | 5/2018 | Koch |
| 2018/0132422 A1 | 5/2018 | Hassanzadeh et al. |
| 2018/0132423 A1 | 5/2018 | Rowan |
| 2018/0168094 A1 | 6/2018 | Koch |
| 2018/0199499 A1 | 7/2018 | Adams |
| 2018/0199505 A1 | 7/2018 | Beaujot |
| 2018/0206393 A1 | 7/2018 | Stoller |
| 2018/0210443 A1 | 7/2018 | Matsuzaki |
| 2018/0263174 A1 | 9/2018 | Hodel |
| 2018/0292339 A1 | 10/2018 | Gunzenhauser |
| 2018/0317380 A1 | 11/2018 | Bassett |
| 2018/0317381 A1 | 11/2018 | Bassett |
| 2018/0368310 A1 | 12/2018 | Zimmerman |
| 2018/0373264 A1 | 12/2018 | Madsen |
| 2019/0021211 A1 | 1/2019 | Gutknecht |
| 2019/0029165 A1 | 1/2019 | Leimkuehler et al. |
| 2019/0045703 A1 | 2/2019 | Bassett |
| 2019/0059206 A1 | 2/2019 | Stanhope |
| 2019/0072114 A1 | 3/2019 | Myers et al. |
| 2019/0075714 A1 | 3/2019 | Koch |
| 2019/0124824 A1 | 5/2019 | Hubner |
| 2019/0162164 A1 | 5/2019 | Funk |
| 2019/0174666 A1 | 6/2019 | Mantemach |
| 2019/0191622 A1 | 6/2019 | Hafvenstein |
| 2019/0232304 A1 | 8/2019 | Grimm |
| 2019/0239413 A1 | 8/2019 | DeGarmo |
| 2019/0254223 A1 | 8/2019 | Eichhorn |
| 2019/0286915 A1 | 9/2019 | Patil |
| 2019/0289778 A1 | 9/2019 | Koch |
| 2019/0297769 A1 | 10/2019 | Zielke et al. |
| 2019/0297774 A1 | 10/2019 | Hamilton |
| 2019/0302799 A1 | 10/2019 | Schaff |
| 2019/0373801 A1 | 12/2019 | Schoeny |
| 2019/0380259 A1 | 12/2019 | Frank |
| 2019/0387662 A1 | 12/2019 | Viriat |
| 2020/0029486 A1 | 1/2020 | Buehler et al. |
| 2020/0045869 A1 | 2/2020 | Stanhope |
| 2020/0053954 A1 | 2/2020 | Hamilton |
| 2020/0068778 A1 | 3/2020 | Schoeny |
| 2020/0068783 A1 | 3/2020 | Strnad |
| 2020/0100418 A1 | 4/2020 | Komecki |
| 2020/0100419 A1 | 4/2020 | Stanhope |
| 2020/0100421 A1 | 4/2020 | Wang |
| 2020/0100423 A1 | 4/2020 | Dienst |
| 2020/0109954 A1 | 4/2020 | Li |
| 2020/0128723 A1 | 4/2020 | Eichhorn |
| 2020/0154627 A1 | 5/2020 | Plattner |
| 2020/0154629 A1 | 5/2020 | Holoubek et al. |
| 2020/0178455 A1 | 6/2020 | Ishikawa |
| 2020/0217044 A1 | 7/2020 | Martel |
| 2020/0221630 A1 | 7/2020 | Pomedli |
| 2020/0296882 A1 | 9/2020 | Madison |
| 2020/0305335 A1 | 10/2020 | Schoeny |
| 2020/0329631 A1 | 10/2020 | Johnson |
| 2020/0337218 A1 | 10/2020 | Puhalla |
| 2020/0352088 A1 | 11/2020 | Arnett |
| 2020/0359559 A1 | 11/2020 | Koch |
| 2020/0375081 A1 | 12/2020 | Holoubek |
| 2020/0375085 A1* | 12/2020 | Strnad .................... A01C 7/205 |
| 2020/0375090 A1 | 12/2020 | Morgan |
| 2021/0022286 A1 | 1/2021 | Gilbert et al. |
| 2021/0051846 A1 | 2/2021 | Vandenbark |
| 2021/0059102 A1 | 3/2021 | Geistkemper |
| 2021/0120726 A1 | 4/2021 | Barrick |
| 2021/0132618 A1 | 5/2021 | Van Roekel |
| 2021/0153421 A1 | 5/2021 | Holoubek et al. |
| 2021/0161060 A1 | 6/2021 | Kaufmann |
| 2021/0185903 A1 | 6/2021 | Demiter et al. |
| 2021/0235611 A1 | 8/2021 | Fett |
| 2021/0243939 A1 | 8/2021 | Strnad |
| 2021/0243941 A1 | 8/2021 | Buehler |
| 2021/0307236 A1 | 10/2021 | Strnad |
| 2021/0315147 A1 | 10/2021 | Fanshier |
| 2021/0329838 A1 | 10/2021 | Zielke |
| 2022/0000008 A1 | 1/2022 | Hubner |
| 2022/0061202 A1 | 3/2022 | Holoubek et al. |
| 2022/0061208 A1 | 3/2022 | Campbell et al. |
| 2022/0142039 A1 | 5/2022 | Eichhorn et al. |
| 2022/0151138 A1 | 5/2022 | Barry |
| 2022/0174855 A1 | 6/2022 | Zielke et al. |
| 2022/0232753 A1 | 7/2022 | Van De Woestyne |
| 2022/0272888 A1 | 9/2022 | Hodel |
| 2022/0369534 A1 | 11/2022 | Nikolakakis |
| 2023/0145955 A1 | 5/2023 | Schmidt et al. |
| 2023/0180653 A1 | 6/2023 | Barry et al. |
| 2023/0232733 A1 | 7/2023 | Barry |
| 2023/0388458 A1 | 11/2023 | Eichhorn et al. |
| 2023/0413720 A1 | 12/2023 | Barry et al. |
| 2024/0167848 A1 | 5/2024 | Johnson |
| 2024/0180066 A1 | 6/2024 | Holoubek |
| 2024/0334864 A1 | 10/2024 | Holoubek et al. |
| 2025/0133977 A1 | 5/2025 | Barry et al. |
| 2025/0348988 A1 | 11/2025 | Eichhorn |
| 2026/0056032 A1 | 2/2026 | Roe |

FOREIGN PATENT DOCUMENTS

| | | |
|---|---|---|
| AU | 2017382800 B2 | 6/2018 |
| AU | 2018100865 B4 | 6/2022 |
| CA | 2346724 A1 | 4/2000 |
| CA | 2549371 A1 | 11/2007 |
| CA | 2584736 A1 | 9/2008 |
| CA | 2727188 A1 | 12/2009 |
| CN | 108362267 A | 8/2018 |
| CN | 110667889 A | 1/2020 |
| CN | 112601450 A | 4/2021 |
| DE | 202005007450 U1 | 7/2005 |
| EP | 372901 A2 | 6/1990 |
| EP | 606541 A1 | 1/1997 |
| EP | 3219186 A1 | 9/2017 |
| EP | 2901838 B1 | 11/2017 |
| EP | 3698615 A1 | 8/2020 |
| GB | 18381 | 10/1904 |
| GB | 2309622 A | 6/1997 |
| JP | 4517467 B2 | 8/2010 |
| KR | 101728137 B1 | 4/2017 |
| RU | 2355152 C2 | 5/2009 |
| SU | 948316 A1 | 8/1982 |
| SU | 1148582 A | 4/1985 |
| WO | 2009134144 A1 | 11/2009 |
| WO | 2014153157 A1 | 9/2014 |
| WO | 2015171908 A1 | 11/2015 |
| WO | 2017160860 A1 | 9/2017 |
| WO | 2017197274 A1 | 11/2017 |
| WO | 2017197292 A1 | 11/2017 |
| WO | 2018151989 A1 | 8/2018 |
| WO | 2020012369 A3 | 1/2020 |
| WO | 2020049467 A1 | 3/2020 |
| WO | 2021021594 A1 | 2/2021 |
| WO | 2021231159 A1 | 11/2021 |

OTHER PUBLICATIONS

John Deere Delta Force Diagram.
Precision Planting 2010 Full Line Brochure.
Boss 18 Metre Parallelogram Tyne Planter—https://www.thecombineforum.com/threads/boss-18-metre-parallelogram-tyne-planter-on-9-spacing.222722/, Unknown, available as early as 2010.
360 Yield Sensor—Wave—Unknown, available as early as 2020.
Contour King Gallery—ZML, Unknown, available as early as 2013.
Dawn ACS Explanation video, https://twitter.com/DawnEquipment/status/969698839409111045.
Deere SeedStar 2 Deere SeedStar XP Monitor for Planters.
Enfield Technologies, EQV Proportional Pinch Valves, https://www.enfieldtech.com/Products/EQV-Proportional-Pinch-Valves.

(56) References Cited

OTHER PUBLICATIONS

Farm Equipment—ZML.

Ground Breaker Precision Planters and Patented Tyne and Disc Row Units—https://www.precisionagsolutions.com.au/ground-breaker.

Janke Australia, available as early as 2017—https://www.janke.com.au/.

Modular Row Crop Planting Systems from Excel Agriculture, available as early as 2002—https://www.excelagr.com.au/excel-agri-row-crop-planter.php.

Orthman ItRIPr row unit, 2019.

Parallelogram Tyne Units—https://bossagriculture.com.au/home/planter-row-units/parallelogram-tyne-units/.

Patriot Parallelogram Tyne Planter Farm Equipment Gessner, available as early as 2017—https://www.gessner.com.au/products/patriot-parallelogram-tyne-planter/.

Precision Planting Furrowforce.

Precision Planting FurrowJet, Unknown—available as early as 2017.

What to Look for in a No Till or Minimum Tillage Planter—https://multifarmingsystems.com.au/wp-content/uploads/2015/07/What-to-Look-for-in-a-No-Till-or-Minimum-Tillage-Planter.pdf.

ZML Contour King, Youtube Video Aug. 13, 2021.

Page 130 of version 5.2 Operating Manual for the Ag Leader Integra, Part No. 4002083, Date Unknown—available as early as 2025.

360 Yield Sensor—Wave—Date Unknown, available as early as 2020.

8910 Floating Hitch Cultivator, Date Unknown, available as early as 2010—https://www.bourgault.com/en-us/products/tillage/8910-cultivator.

Boss 18 Metre Parallelogram Tyne Planter—https://www.thecombineforum.com/threads/boss-18-metre-parallelogram-tyne-planter-on-9-spacing.222722/, Date Unknown, available as early as 2010.

Contour King Gallery—ZML, Date Unknown, available as early as 2013.

Dawn ACS Explanation video, https://twitter.com/DawnEquipment/status/969698839409111045, 2018.

Deere "SeedStar 2 Deere SeedStar XP Monitor for Planters" pp. 70-8-70-9, Date Unknown, available as early as 2012.

Enfield Technologies, EQV Proportional Pinch Valves, https://www.enfieldtech.com/Products/EQV-Proportional-Pinch-Valves, Date Unknown, available as early as 2024.

Farm Equipment—ZML, Date Unknown, available as early as 2021, https://www.zimmermanmfg.com/farm-equipment-zml/.

Ground Breaker Precision Planters and Patented Tyne and Disc Row Units—https://www.precisionagsolutions.com.au/ground-breaker, Date Unknown, available as early as 2023.

Industrial Electronics Robust control of active suspensions for high performance vehicles, Proceedings of IEEE International Symposium on Industrial Electronics, 1996.

Industrial electronics, modeling and force tracking control of hydraulic actuator for an active suspension system, 2006 1st IEEE Conference on Industrial Electronics and Applications, 2006.

Janke Australia, Date Unknown, available as early as 2017—https://www.janke.com.au/.

Kasper, relationship between six years of corn yields and terrain attributes, ISU—Kaspar, Tom & Colvin, Thomas & Jaynes, D.B. & Karlen, Douglas & James, David & Meek, David & Pulido, Daniel & Butler, Howard. (2003). Relationship Between Six Years of Corn Yields and Terrain Attributes. Precision Agriculture. 4. 87-101.

Gratton et al, Manitoba, Design of a spring-loaded downforce system for a no-till seed opener, 2003.

Zong-yi et al., Minesweeping Tank, Electrohydraulic System Using RBF Neural Network and Genetic Algorithm, 2010.

Modular Row Crop Planting Systems from Excel Agriculture, Date Unknown, available as early as 2002—https://www.excelagr.com.au/excel-agri-row-crop-planter.php.

Orthman ItRIPr row unit, 2019, https://www.orthmanequip.com/strip-tillage/1tripr/.

Parallelogram Tyne Units, https://bossagriculture.com.au/home/planter-row-units/parallelogram-tyne-units/, Date Unknown, available as early as 2023.

Patriot Parallelogram Tyne Planter Farm Equipment Gessner, Date Unknown, available as early as 2017—https://www.gessner.com.au/products/patriot-parallelogram-tyne-planter/.

Precision Planting Furrowforce, Date Unknown—available as early as 2017—https://precisionplanting.com/products/product/furrowforce.

Precision Planting FurrowJet, Date Unknown—available as early as 2017, https://precisionplanting.com/products/product/furrowjet.

Precision tyne planter takes innovation award, 2017, https://www.graincentral.com/machinery/precision-tyne-planter-takes-innovation-award.

What to Look for in a No Till or Minimum Tillage Planter—https://multifarmingsystems.com.au/wp-content/uploads/2015/07/What-to-Look-for-in-a-No-Till-or-Minimum-Tillage-Planter.pdf, 2015.

ZML Contour King, Youtube Video Aug. 13, 2021, https://www.youtube.com/watch?v=T-rj_EZMCM4.

* cited by examiner

Deep

Shallow

PLANTER DOWNFORCE AND UPLIFT MONITORING AND CONTROL FEEDBACK DEVICES, SYSTEMS AND ASSOCIATED METHODS

CROSS-REFERENCE TO RELATED APPLICATION(S)

This application is a divisional application of U.S. patent application Ser. No. 16/142,522, filed Sep. 26, 2018 which claims priority to U.S. Provisional Application No. 62/632,288 filed Feb. 19, 2018, which is hereby incorporated by reference in their entirety under 35 U.S.C. § 119(e).

TECHNICAL FIELD

The disclosed technology relates generally to devices, systems and methods for use in planting, and in particular, to the devices, methods, and design principles allowing for the monitored and/or controlled application of downforce to individual row units in both normal and high-speed planting implementations. This has implications for high speed, high yield planting of corn, beans and other agricultural crops.

BACKGROUND

The disclosure relates to apparatus, systems and methods for use in high speed planting applications. There is a need in the art for improved, efficient systems for the monitoring of an opened furrow and controlled application of net downforce to individual row units via valves in fluidic communication with individual actuators.

BRIEF SUMMARY

Discussed herein are various devices, systems and methods relating to a system for the application of downforce to an individual row unit.

In various Examples, a system of one or more computers can be configured to perform particular operations or actions through software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One Example includes a row unit downforce system including: a downforce actuator in operational communication with the row unit and constructed and arranged to apply supplemental downforce to the row unit and opening disks; a monitoring system including at least one furrow depth sensor constructed and arranged to generate furrow depth values; and a control system module, where the control system module is constructed and arranged to generate actuator command signals in response to the furrow depth values. Other embodiments of this Example include corresponding computer systems, apparatus, and computer programs recorded on one or more computer storage devices, each configured to perform the actions of the methods.

Implementations of this Example may include one or more of the following features. The row unit downforce system further including a shoe disposed between the opening disks, where the at least one sensor is disposed on the shoe. The row unit downforce system further including a gauge wheel load sensor in operational communication with the control system module. The row unit downforce system further including a downforce control system in operational communication with the control system module and constructed and arranged to generate actuator command signals for transmission and operation of the actuator. The row unit downforce system where the downforce control system includes at least one proportional-integral-derivative control. The row unit downforce system where downforce control system utilizes gauge wheel load and furrow depth to modify applied downforce. Implementation of this Example of the described techniques may include hardware, a method or process, or computer software on a computer-accessible medium.

Another Example includes a system for the application of supplemental downforce to a row unit via an actuator including an on-the-go monitoring system including at least one sensor constructed and arranged to generate furrow depth values. Other embodiments of this Example include corresponding computer systems, apparatus, and computer programs recorded on one or more computer storage devices, each configured to perform the actions of the methods.

Implementations of this Example may include one or more of the following features. The system where the at least one furrow depth sensor is a non-contact sensor. The system where the at least one sensor is a non-contact furrow depth sensor rigidly mounted to the row unit and is positioned to measure a seed furrow bottom distance. The system where the at least one sensor further includes a second non-contact ground level sensor, where the system including a rider disposed on a support arm and constructed and arranged to physically contact the furrow. The system including a shoe or seed firmer including one or more sensors disposed on substantially vertical surfaces. The system where the one or more sensors are disposed adjacent to a side or edge of the furrow. The system where the one or more sensors are disposed adjacent to an outer circumferential edge of a gauge wheel. The system where the one or more sensors are disposed adjacent to an outer circumferential edge of an opening disk. The system where the one or more sensors are constructed and arranged to detect an observed or actual revolution speed of a gauge wheels and/or an opening disk by sensing a rotating trigger mechanism. Implementation of this Example of the described techniques may include hardware, a method or process, or computer software on a computer-accessible medium.

One Example includes a row unit downforce system including: a downforce actuator in operational communication with the row unit and constructed and arranged to apply supplemental downforce to the row unit and opening disks, and an on-the-go monitoring system including at least one furrow depth sensor constructed and arranged to generate furrow depth values. Other embodiments of this Example include corresponding computer systems, apparatus, and computer programs recorded on one or more computer storage devices, each configured to perform the actions of the methods.

Implementations of this Example may include one or more of the following features. The row unit downforce system including a gauge wheel load sensor constructed and arranged to generate gauge wheel load values. The row unit downforce system including a feedback control system, where the control system module is constructed and arranged to generate actuator command signals in response to furrow depth values and gauge wheel load values. The row unit downforce system where the at least one furrow depth sensor is disposed on a shoe. Implementations of this Example of the described techniques may include hardware, a method or process, or computer software on a computer-accessible medium.

One Example includes a row unit downforce system including a downforce actuator in operational communication with the row unit and constructed and arranged to apply supplemental downforce to the row unit and opening disks, a monitoring system including at least one furrow depth sensor constructed and arranged to generate furrow depth values; and a control system module, where the control system module is constructed and arranged to generate actuator command signals in response to the furrow depth values.

One Example includes a system for the application of supplemental downforce to a row unit via an actuator including an on-the-go monitoring system including at least one sensor constructed and arranged to generate furrow depth values.

One Example includes a row unit downforce system including a downforce actuator in operational communication with the row unit and constructed and arranged to apply supplemental downforce to the row unit and opening disks, and an on-the-go monitoring system including at least one furrow depth sensor constructed and arranged to generate furrow depth values.

It is appreciated that each of the furrow depth sensing methods and gauge wheel and opening disk sensing methods have utility as stand-alone devices, systems and methods.

Other embodiments of these Examples include corresponding computer systems, apparatus, and computer programs recorded on one or more computer storage devices, each configured to perform the actions of the methods.

While multiple embodiments are disclosed, still other embodiments of the disclosure will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

DETAILED DESCRIPTION

The various embodiments disclosed or contemplated herein relate to devices, methods, and design principles allowing for the application of net downforce to individual row units in planting applications. The various implementations disclosed herein relate to technologies for achieving downforce on a planter with independent row by row control capability. The implementations disclosed herein can be used in conjunction with any of the technologies and/or devices, systems and methods disclosed in Co-Pending U.S. application Ser. No. 16/121,065, filed Sep. 4, 2018 entitled "Improved Planter Down Pressure And Uplift Devices, Systems And Associated Methods," as well as U.S. Pat. No. 9,801,329, issued on Oct. 31, 2017; U.S. Pat. No. 9,629,304, issued on Apr. 25, 2017; U.S. application Ser. No. 15/462, 276, filed Mar. 17, 2017; and U.S. application Ser. No. 15/717,296 filed Sep. 27, 2017, each of which is entitled "On-The Go Soil Sensors And Control Methods For Agricultural Machines," and all of which are incorporated herein by reference in their entirety.

The implementations disclosed herein relate to a downforce system 10 comprising at least one of an on-the-go furrow monitoring system 20 and/or feedback control system 30. That is, various implementations of the downforce system 10 include devices, systems and methods that measure and monitor the depth of the seed furrow during planting with supplemental downforce.

Figure 1:
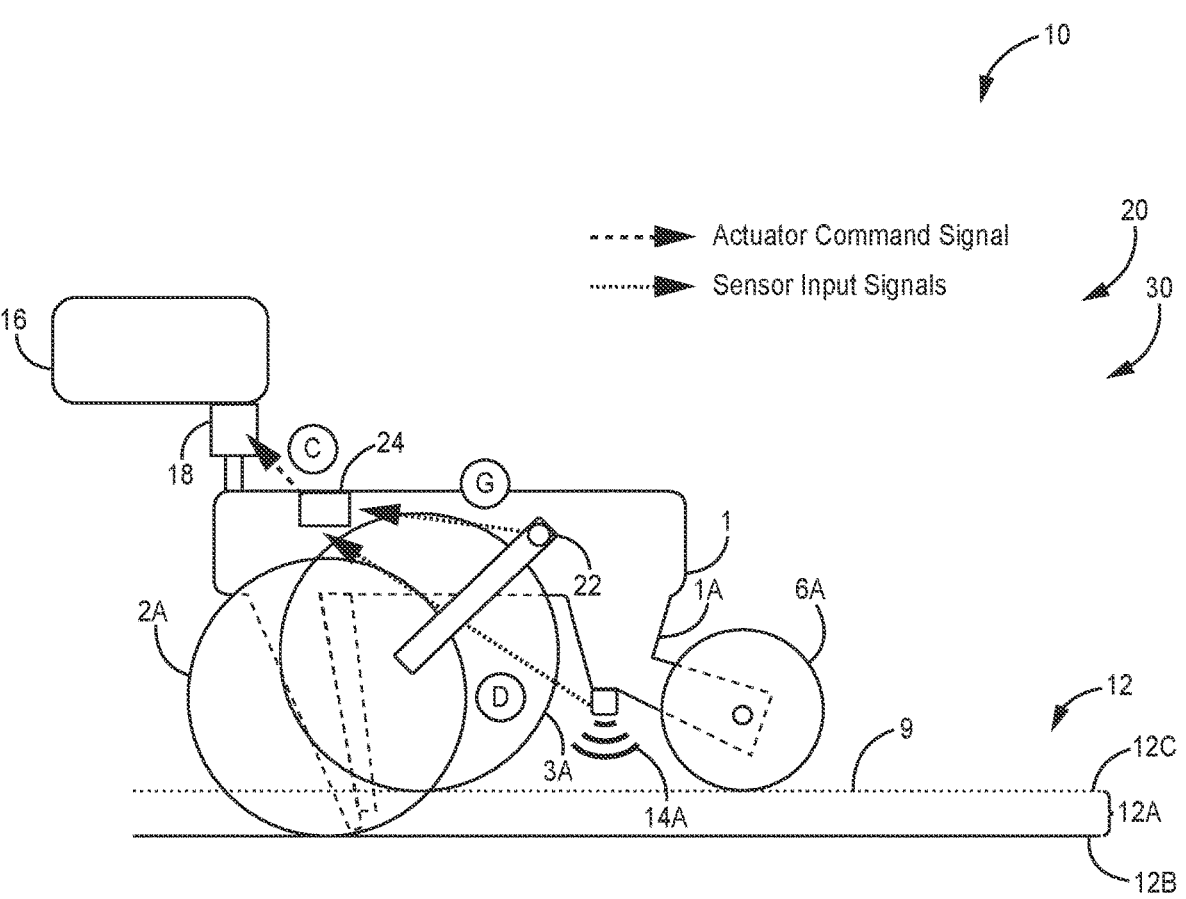
FIG. 1 is a side view of a row unit, according to one implementation.

As shown in the implementation of FIG. 1, certain implementations of the downforce system 10 include an on-the-go monitoring system 20 and/or a downforce control system 30. In implementations comprising an on-the-go monitoring system 20, the downforce system 10 is able to establish the depth of the open furrow 12. In implementations featuring a downforce control system 30, the downforce system 10 is able to use seed furrow 12 depth 12A alone or in combination with other forms of data inputs to control feedback. A top view of an implementation comprising the monitoring system 20 is also shown in FIG. 2.

Figure 2:
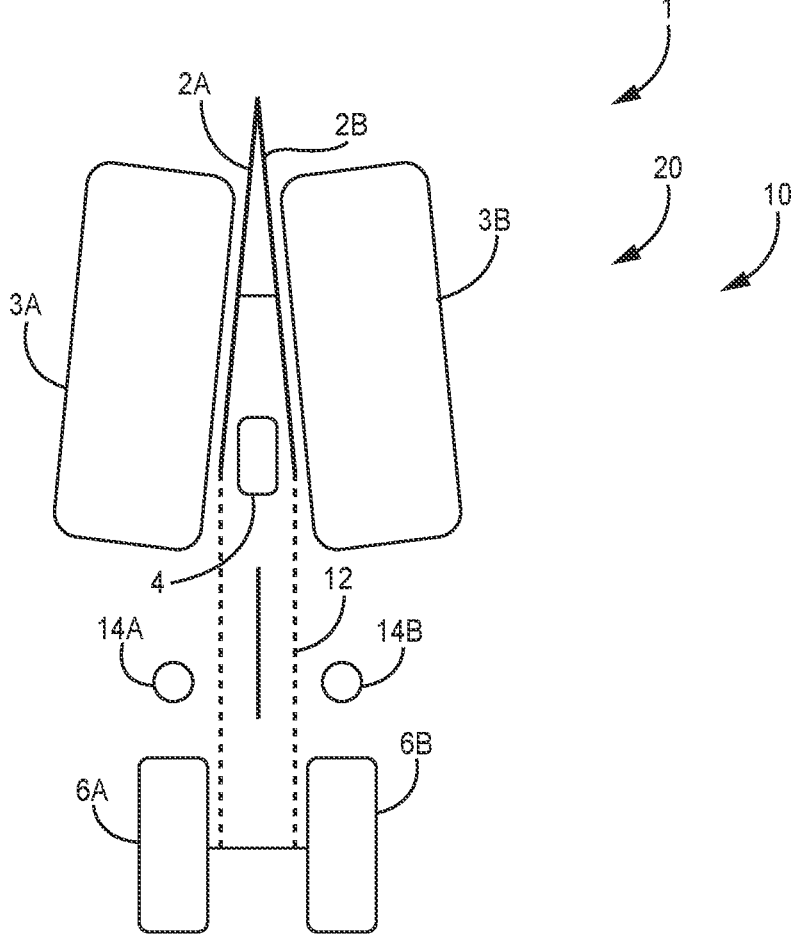
FIG. 2 is a top view of a row unit, according to one implementation.

As shown in FIG. 1 and FIG. 2, in a planter row unit 1 according to various implementations of the control system 10, opening disks 2A, 2B are disposed ahead of and within gauge wheels 3A, 3B, which roll along the ground 9, as has been previously described. A seed tube 4 is disposed within the gauge wheels 3A, 3B and constructed and arranged to plant seed into the furrow 12 opened by the opening disks 2A, 2B, as has been previously described. Closing wheels 6A, 6B constructed and arranged to close the furrow 12 are disposed behind the gauge wheels 3A, 3B, as has been previously described.

As discussed herein, in certain implementations, one or more trench depth sensors, such as a first sensor 14A and a second sensor 14B can be disposed in the vicinity of the opening furrow 12. The various on-the-go system 20 embodiments described herein can include both non-contact and contact sensors 14A, 14B. It is understood that the various sensors 14, 14A, 14B described herein can be contact or non-contact sensors as applicable.

These embodiments of the downforce system 10 having an on-the-go monitoring system 20 may be used by an electronic system to display, log and map furrow depth and/or as feedback for an on-the-go automatic furrow depth control system or on-the-go system 20.

As is also shown in FIG. 1, the row unit 1 according to certain implementations of the downforce system 10 comprising a sensor 14 such as a non-contact sensor 14 is affixed to a tool bar 16. Various implementations of the row unit 1 have a force transfer actuator 18 that is constructed and arranged to apply downforce to the row unit 1 and in particular the opening disks 2A, 2B.

Certain implementations of the downforce system 10 including a downforce control system 30 that uses seed furrow 12A alone or in combination with other forms of data inputs to control feedback to the actuator 18.

In various implementations, the downforce system 10 is has a gauge wheel load sensor 22. In various implementations, the various contact and non-contact sensors 14, 14A, 14B described herein and/or gauge wheel load sensor 22 are in electronic or otherwise operational communication with a control system module 24. In use according to these implementations, the sensors 14 and/or gauge wheel load sensor 22 are constructed and arranged to record and transmit or otherwise generate data points or sensor input signal values (shown in FIG. 1 as reference arrows D and G, respectively) that are transmitted to the control system module 24. For example, a non-contact sensor 14 can be constructed and arranged to generate furrow depth measurements, while the gauge wheel load sensor 22 is constructed and arranged to generate gauge wheel load values.

In these implementations, the control system module 24 is in turn constructed and arranged to generate actuator command signals (reference arrow C) to command the actuator 18. That is, in these implementations, the downforce system 10 comprises one or more trench depth sensors 14 and one or more gauge wheel load sensors 22, and is constructed and arranged to adjust downforce actuation in response to the detected furrow depth and/or gauge wheel load values and adjust the actuation when one or more of the sensed values exceeds a set point or other pre-determined threshold. In further implementations, a control feedback system 30 combines the sensed furrow depth and gauge load values and is configured to control actuation, as would be understood.

For example, in certain implementations, at least one of gauge wheel load value (drawn, for example, from the gauge wheel load sensor 22) and the seed furrow depth value (drawn from other sensors, such as the non-contact sensors 14A, 14B) generated the on-the-go monitoring system 20 are used by the control feedback system 30 to establish the amount of actuator 18 supplemental force. It is understood that these control system implementations allow the downforce system 10 to provide a faster, more precise response when the gauge wheels lose contact with the ground.

It is understood that current down force systems typically rely on monitoring the gauge wheel 3A, 3B load during operation to provide feedback for closed-loop control systems. This gauge wheel-based approach works well when the wheels are in firm and constant contact with the soil. However, it is understood that in practice conditions arise when the applied down force is insufficient to keep the wheels 3A, 3B in firm contact with the ground. When this happens in prior art systems, no information is provided to the control system on the magnitude of planter depth loss, if any. This prevents the control system from tailoring its response appropriately. It is understood that in the implementations disclosed herein, a down force control algorithm makes use of depth loss magnitude to improve actuator control, and in certain implementations to increase actuator reaction time when depth is lost.

In these implementations, if the amount of depth loss is available as feedback to the control system 30, via any number of sensing methods, it can increase applied down pressure more rapidly and forcefully when depth loss is larger. This reduces the amount of time seed is planted too shallow. Correspondingly, the system can increase applied down pressure more slowly and gently when depth loss is small or non-existent. This prevents or reduces the over-application of down force which can cause undesirable soil compaction.

Returning to the implementations of the system 10 of FIG. 1 and FIG. 2 in detail, it is understood that there are numerous approaches to measuring seed furrow depth which rely on one or more sensors 14A, 14B. These sensors can be used to measure from a reference to the bottom 12B of the seed furrow 12 or the surface of the ground 12C. Further discussion of these sensors 14A, 14B is found below in relation to FIGS. 4-21.

In implementations like that of FIG. 1, two or more control feedback inputs are utilized. In various implementations, a first control feedback relates to gauge wheel load (from the gauge wheel sensor 22) and another relates to seed furrow depth 12A, as determined by any of the contemplated sensors 14A, 14B discussed herein. Other implementations are of course possible. The various implementations of the down force control system 10 including this feedback control system 30 provide a faster, more precise response when the gauge wheels lose contact with the ground.

Figure 3:
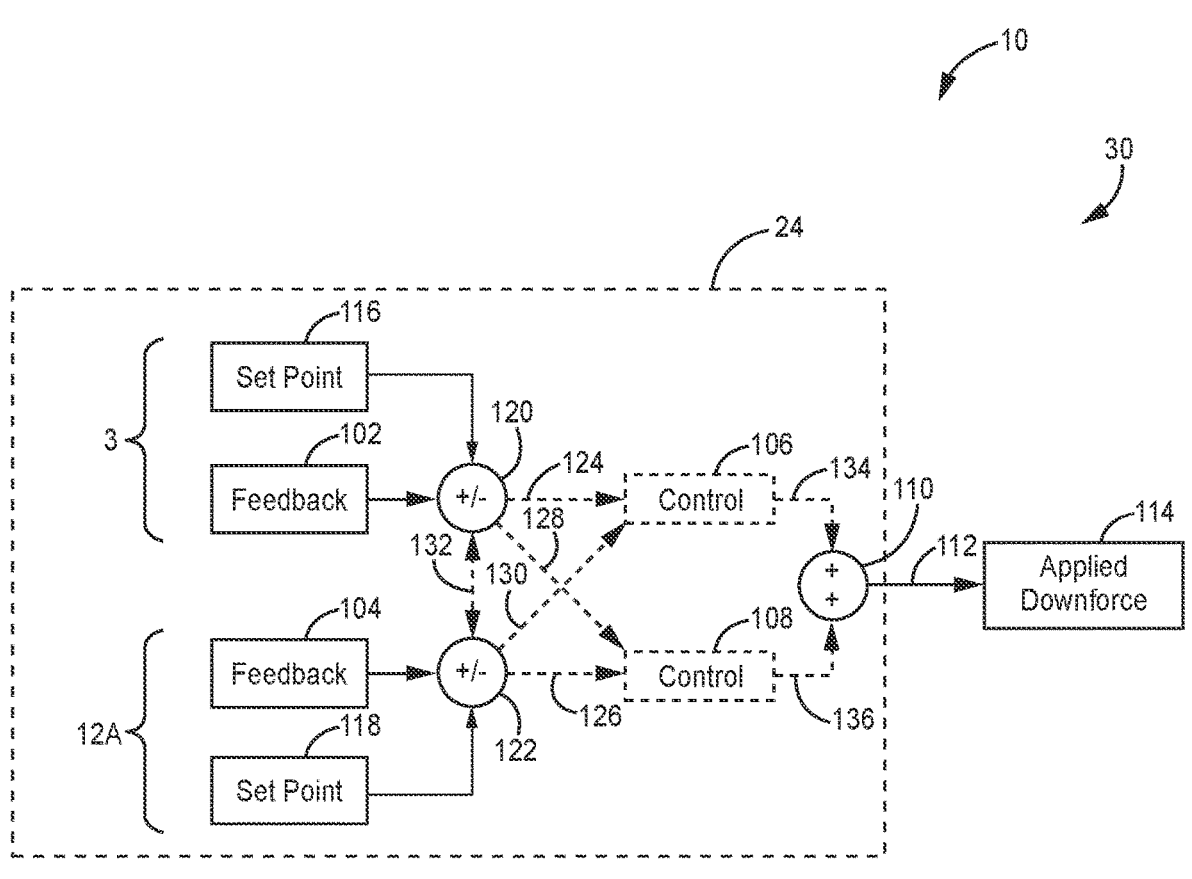
FIG. 3 shows a schematic of a downforce system, according to one implementation.

FIG. 3 depicts a downforce system 10, according to one implementation. It is understood that in these and other implementations, a control system 30 utilizes gauge wheel load input signals 102 and furrow depth feedback input signals 104, such as from the collection and transmission of continuous, real time or a time series of recorded measurements. In various implementations these input signals 102, 104 are collected via the sensors (shown elsewhere at 14, 22) that are in operable communication with a control system module 24.

The control system module 24 is in turn constructed and arranged so as to generate actuator command signals 110 for transmission and operation of the actuator 18 as applied downforce 114.

In these implementations, each of the gauge wheel load sensor feedback 102 and planting or furrow depth sensor feedback 104 (shown in FIG. 1 as reference arrows D and G, respectively) can have its own control (at boxes 106 and 108, respectively). As is explained further below, each of these controls 106, 108 is optional. In various implementations, the controls 106, 108 can be a proportional-integral-derivative ("PID") control, a machine learning control, a predictive function control, a lookup table and/or a model predictive control, such that various implementations can have one or more such controls 106, 108 in operable communication with a final summation block or controller output 110 that is constructed and arranged to establish the downforce command 112 voltage transmitted to the actuator 18 as applied downforce 114.

That is, in use, the final summation block or controller output 110 is constructed and arranged to process the gauge wheel load sensor and planting or furrow depth sensor signals so as to modify the downforce applied by the actuator 18. It is understood that in these and other implementations, each of the gauge wheel and furrow depth feedback paths can supply its own contribution, which can be modulated by set points/thresholds 116. 118 to the total supplemental down force 114 applied to the planter row unit 1.

In various implementations, the gauge wheel set point 116 and planting depth set point 118 can either be specified by the user or may be adjusted dynamically as ground conditions, soil properties, vehicle speed, or other conditions change, as has been previously described.

In various implementations, feedback 102 from the gauge wheel with the optional set point 116 are summed 120 and planting depth feedback 104 with the optional set point 118 are summed 122 and used to calibrate the overall gauge wheel load error and planting depth error via a direct connection 124 to the gauge wheel control 106 and/or direct connection 126 to the planting depth control 108, respectively. It is understood that in various implementations, each of the optional gauge wheel and/or furrow depth feedback systems can be summed via either of the two controllers 106, 108, as is shown at lines 128 and 130, or in alternate implementations, can feed into the other feedback path, as is shown at line 132.

It is understood that according to these implementations, either the gauge wheel control 106 or planting depth control 108 is therefore optional, and that in any event the gauge wheel load feedback system and/or planting depth control feedback system are in operational communication 134 with the controller output 110, so as to modify applied downforce, such as via connections at lines 134 and/or 136. In this way, it is possible under certain implementations for the gauge wheel load feedback system and/or planting depth control feedback system to be optional or interconnected with one another as co-terminal streams of feedback or in communication upstream of one another.

It is further understood that this control system 30 can be a sub-component of a larger control system that is actively controlling and adjusting planting depth, vehicle speed, or seed spacing or population.

Figure 4:
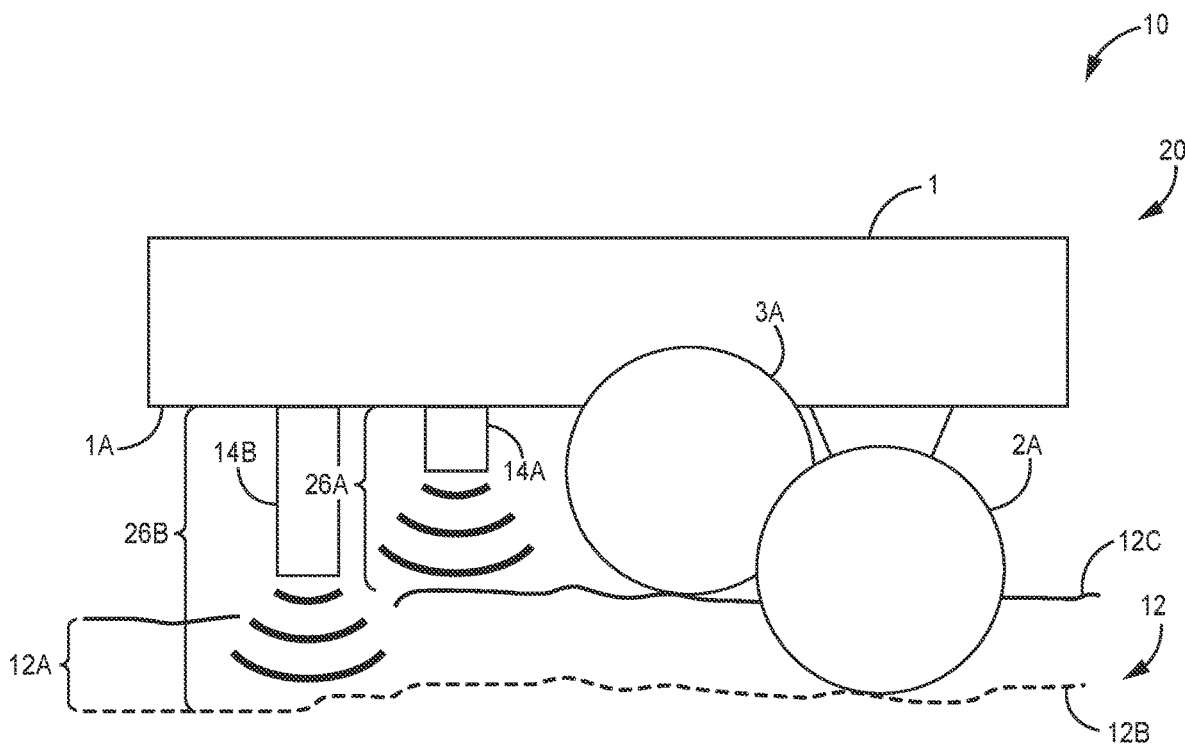
FIG. 4 is a side view of a row unit, according to one implementation.

FIG. 4 depicts one implementation of one implementation of the system 10 comprising an on-the-go monitoring system 20. In this implementation, sensors 14A, 14B are disposed on the row unit and are constructed and arranged to locate both the top 12C and the bottom 12B of the seed furrow 12 thereby establishing furrow depth 12A, which clearly differentiates these embodiments from the prior art.

Figure 5:
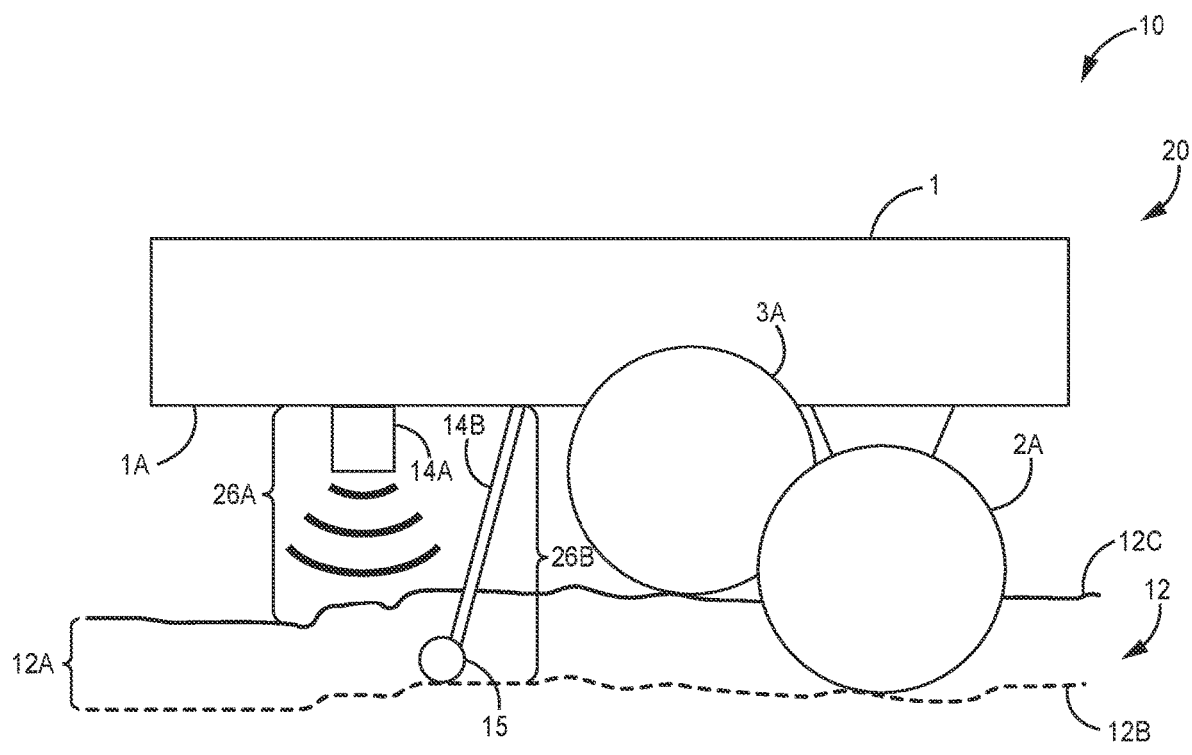
FIG. 5 is a side view of a row unit, according to one implementation.

In these and the other implementations described herein, the sensors 14A, 14B can be contact and/or non-contact sensors, as is shown in FIG. 4 and FIG. 5.

Returning to the implementation of FIG. 4 in detail, a non-contact sensor 14A is fixedly mounted to the planter row unit 1 and is constructed and arranged measures the distance between the sensor 14A and the soil or ground level 12C (the ground surface distance, shown at 26A), while a separate non-contact sensor 14B is rigidly mounted to the planter row unit 1 and is positioned to measure the distance to the bottom 12B of the seed furrow (the furrow depth distance shown at 26B). The system 20 is constructed such that the measurements is used to determine the actual furrow depth 12 at any given moment by subtracting the ground surface distance 26A from the furrow depth distance 26B, as measured from a shared reference location, here the bottom 1A of the row unit 1.

Certain non-contact sensors utilized in various implementations are, but are not limited to, ultrasonic sensors, single distance ultrasonic sensors, phase-array ultrasonic sensors, vision sensors, laser sensors, laser ranging sensors, reflected light intensity sensors, reflected structured light imaging sensors, radar sensors, lidar sensors including but not limited to time of flight imaging and swept beams, stereo camera sensors, rotary encoders, GPS, inertial sensors, and/or linear displacement sensors, including combinations thereof and sensor fusion and/or phased arrays.

In the implementation of FIG. 5, a first sensor 14A is fixedly mounted to the planter row unit 1 and is constructed and arranged to measure the distance between the first sensor 14A—which is a contact sensor in this implementation—and the soil or ground level 12C (the ground surface distance, shown at 26A), while a second sensor 14B—in this implementation a second contact sensor that is constructed and arranged to ride in the seed furrow 12.

The contact sensor 14A of this implementation is constructed and arranged with spring action that urges the distal sensor contact 15 to the bottom 12B of the seed furrow 12. The contact sensor 14B is mounted to the planter row unit 1 so that the angular rotation or deflected distance can be measured to establish the furrow depth distance shown at 26B, as would be understood by those of skill in the art. The system 20 according to these implementations is again constructed such that the measurements is used to determine the actual furrow depth 12 at any given moment by subtracting the ground surface distance (shown at 26A) from the furrow depth distance (shown at 26B), as measured from a shared reference location, here the bottom 1A of the row unit 1.

In certain alternate implementations, the contact sensors can be, but are not limited to, flex resistor sensors, encoders, optical sensors, magnetic sensors, fiber optic sensors, potentiometers, LVDTs, closing wheel sensors, and/or capacitive in-furrow sensors, including combinations thereof and sensor fusion and/or phased arrays.

In certain implementations, the sensor 14B can also infer the depth 12A by measuring the position or angle of any number of mechanical linkages on the row unit, such as the closing wheels or arm, gauge wheels or arm, row cleaners, or seed firming arm or wheel riding in the furrow, as would be readily understood in the art.

Figure 6A:
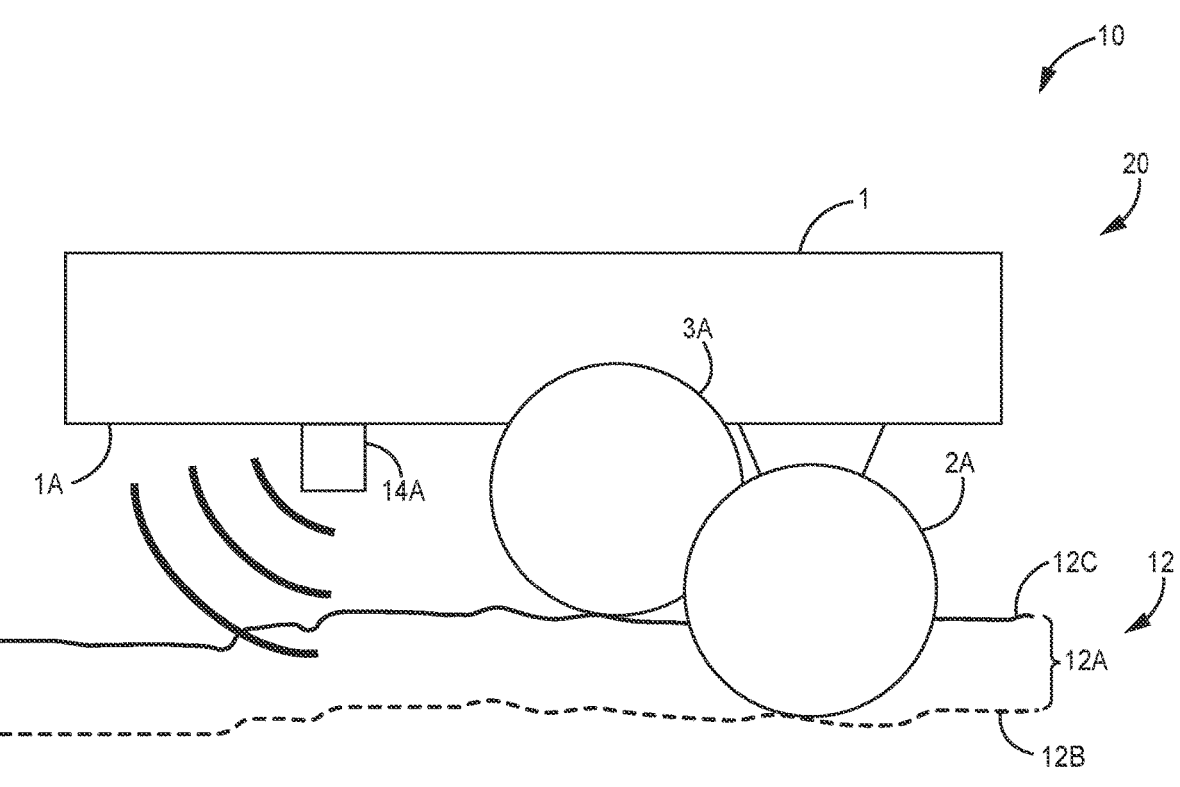
FIG. 6A is a side view of a row unit, according to one implementation.

In the implementation of the monitoring system 20 shown in FIG. 6A, a single sensor 14 is used, which in these implementations is a non-contact sensor 14, mounted to the planter row unit 1. The sensor 14 is either scanned or its returning signal is processed to develop a depth profile for the seed furrow 12. The single sensor 14 according to these implementations can either be scanned across the seed furrow profile or use signal processing to simultaneously measure both the distance to the ground surface 12C and the seed furrow bottom 12B. In various implementations, the sensor 14 can utilize technologies such as radar, lidar, optical, stereo camera, structured light, visible, and/or invisible spectrums, alone or in combination.

Figure 6B:
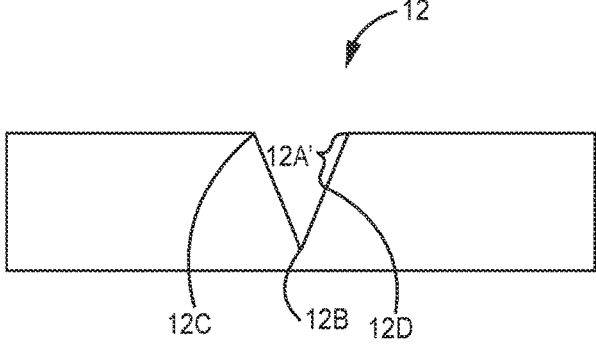
FIG. 6B is a cross-sectional view of a furrow, according to one implementation.

In various of these implementations, the furrow depth 12A is measured by identifying the furrow 12 in the data profile of the sensor 14 and referencing the measurement of the distance 12A between the top of the furrow (ground level 12C) to the furrow bottom 12B, as is shown in further detail in FIG. 6B. In these implementations, the depth 12A' at any given point (shown, for example at 12D) along the furrow 12 profile is measured by subtracting the ground surface distance 12C from the distance at the point of interest, as measured from a shared reference location, such as the bottom of the row unit 1A.

Figure 7:
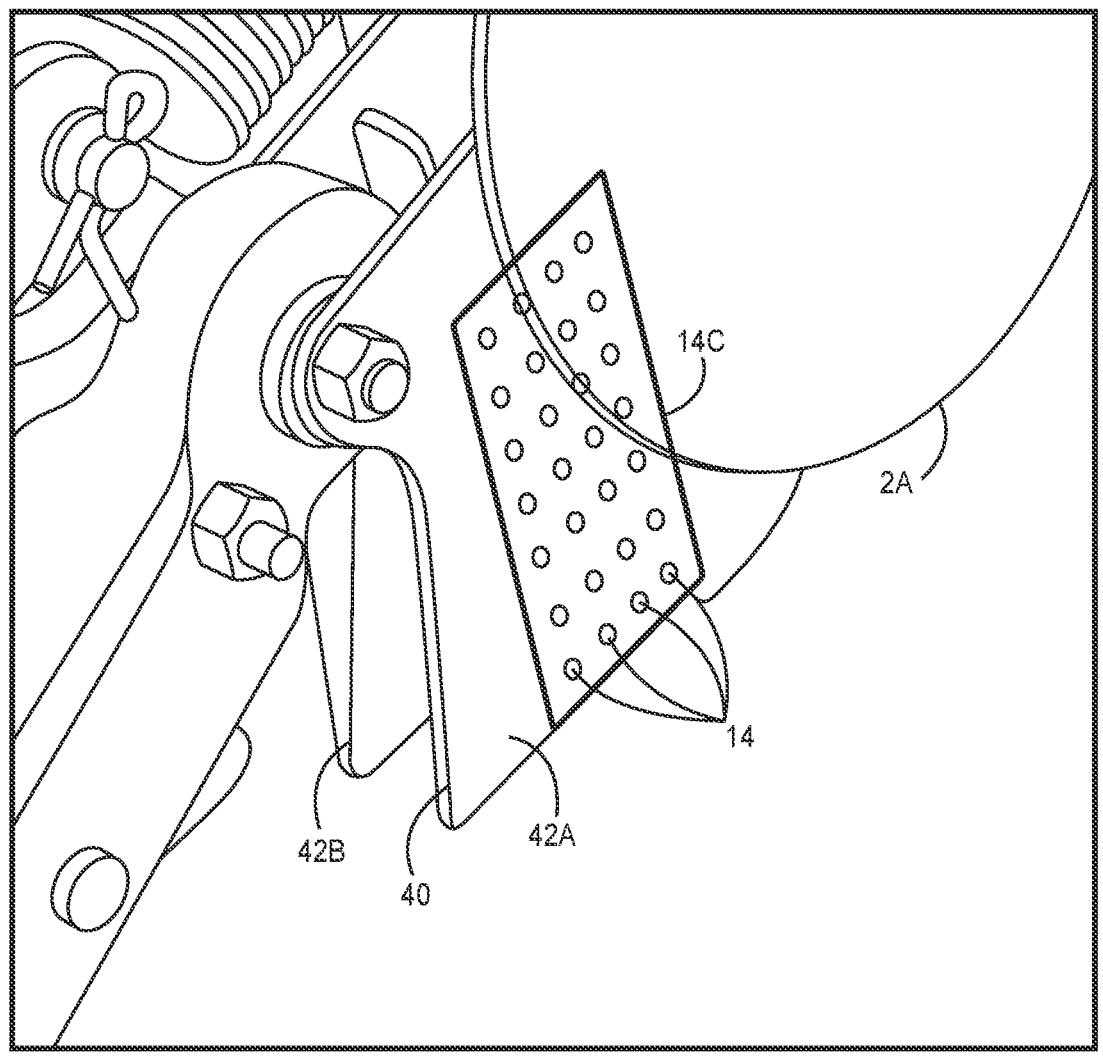
FIG. 7 is a perspective view of a shoe as a sensor platform, according to one implementation.

In certain implementations of the down force control system 10 having a monitoring system 20, such as that of FIG. 7, have a shoe 40 as a sensor 14 platform for on-the-go measurements. It is understood that in these implementations, the shoe 40 is a mechanical device positioned between—or inside—the opening disks 2A, 2B in proximity to the forming seed furrow.

The sensor 14 types affixed to the shoe 40 may include, but are not limited to the following: radar, lidar, machine vision, capacitive sensors, ultrasonic sensors, optical sensors, thermocouple sensors, resistive sensors and/or combinations thereof, as has been described above.

In these implementations, the shoe 40 has one or more substantially vertical surfaces 42A, 42B adjacent to a side or edge of the forming seed furrow, as would be understood. In these implementations, one or more shoe surfaces 42A, 42B are instrumented with one or more sensors 14, including, but not limited to, as part of a sensor array 14C. According to these implementations, one or both surfaces 42A, 42B are proximate the bottom of the seed furrow and extend above the top of the seed furrow sidewall, as would be understood.

While the surfaces 42A, 42B may be disposed substantially vertically, in certain implementations, and as would be understood and appreciated, the shoe 40 can have a substantially horizontal bottom surface (not shown) for affixing one or more instruments to sense parameters at the bottom of furrow. The sensors 14 according to these implementations on the various shoe surfaces 42A, 42B can be constructed and arranged to detect one or more or any combination of the following non-limiting furrow characteristics: furrow depth, soil moisture, soil temperature, soil organic matter, soil uniformity (e.g. presence of clods), count seeds, seed to soil contact, crop residue, soil color, soil type, soil pH, fertility parameters, soil parameters, soil electrical conductivity, soil compaction and the like. It is understood that in various implementations, the surfaces can be disposed at a variety of angles near or within the furrow.

As such, the shoe 40 according to these implementations can detect furrow depth using sensors 14 disposed on the surfaces 42 to measure the height of the adjacent furrow sidewall. These sensors 14 can detect crop residue on top of the soil to exclude it from the height measurement of the seed furrow sidewall, thereby leaving only the height of soil sidewall as the seed furrow depth. Certain of these implementations require the shoe 40 to stay substantially vertically fixed relative to the bottom edge of the opening disk, regardless of depth setting.

According to certain aspects, one or more surfaces 42A, 42B may be adjacent to the inside outer circumferential edge of the gauge wheel (as shown above) such that the edge of the gauge wheel can transversely pass by a sensor 14 mounted on the shoe surface 42. Similarly, various implementations also dispose the sensor 14 such that the inside outer edge of the opening disk 2A transversely passes the sensor 14.

In use according to these implementations, the shoe sensor 14 adjacent to the gauge wheels 3 and/or opening disks 2 can detect an observed or actual revolution speed of the gauge wheels and/or opening disks by sensing a rotating trigger mechanism (not shown) affixed to the inside of the gauge wheels and/or opening disk, as would be understood. In further implementations, the system 10 implements an electronic system to determine a target revolution speed using the planter ground speed and gauge wheel/opening disk circumference and compare it to the actual observed revolutions.

It is understood that in these implementations of the downforce system 10, the monitoring system 20 and/or control system 30 can be constructed and arranged to respond to a slow actual or observed speed by generating a user alarm about a faulty gauge wheel/opening disk. It is understood that such a faulty wheel/disc can be plugged with dirt, have bearing locking up and/or other mechanical faults that cause the actual revolutions to slow. The shoe 40 according to certain implementations can also be constructed and arranged to detect the opening disk radius and/or diameter to indicate a worn disc that might be faulty. Further utilizations would be apparent to those of skill in the art.

These implementations of the shoe 40 can also measure furrow depth by detecting the point on the outer circumferential edge of the opening disk 2A that intersects the outer circumferential edge of the gauge wheel 3A. Additional embodiments are possible.

Figure 8A:
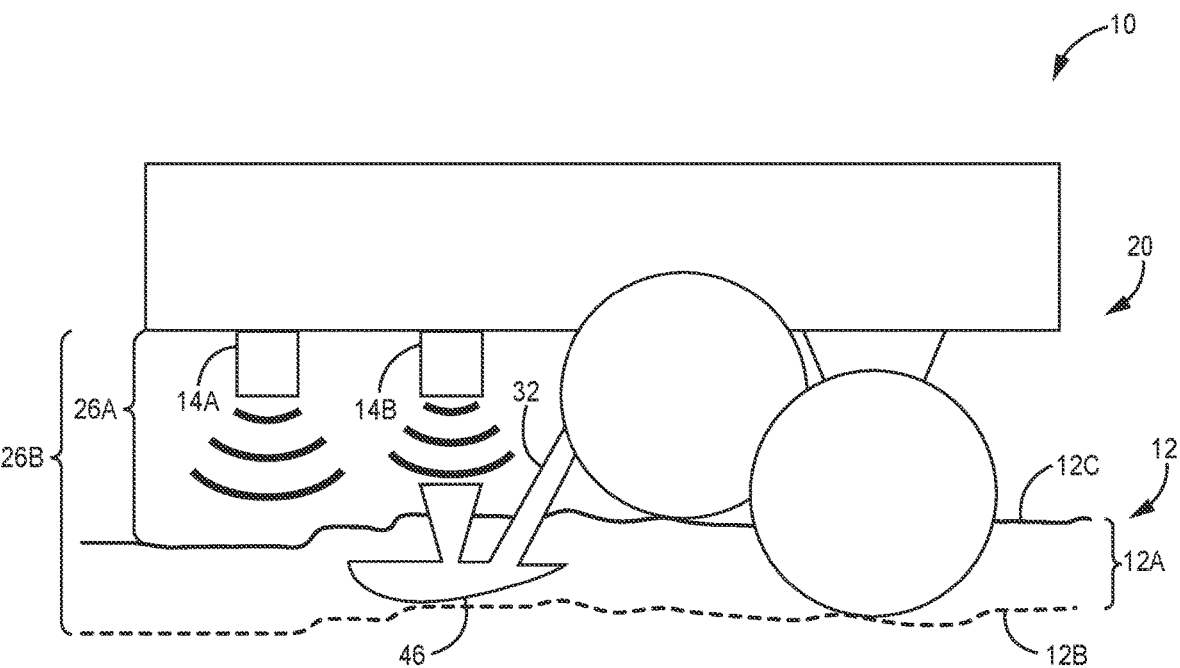
FIG. 8A is a side view of a row unit, according to one implementation.

In the implementation of FIG. 8A, a sensor 14A is fixedly mounted to the planter row unit 1 and is constructed and arranged to measure the distance between the sensor 14A and the soil or ground level 12C (the ground surface distance, shown at 26A), while a second non-contact sensor 14B is rigidly mounted to the planter row unit 1 and is constructed and arranged to measure the distance to a target object 46 in direct communication with the bottom 12B of the furrow 12.

In the implementation of FIG. 8A, the target object 46 is a riding element 46 or rider 46 and is affixed to a flexible, rotating, or deflecting support arm 32, such as a seed firmer, that follows the bottom 12B of the seed furrow 12, and can thereby be used to establish the furrow depth distance shown at 26B. The system 20 according to these implementations is again constructed such that the measurements is used to determine the actual furrow depth 12 at any given moment by subtracting the ground surface distance 26A from the furrow depth distance 26B, as measured from a shared reference location, here the bottom 1A of the row unit 1.

Figure 8B:
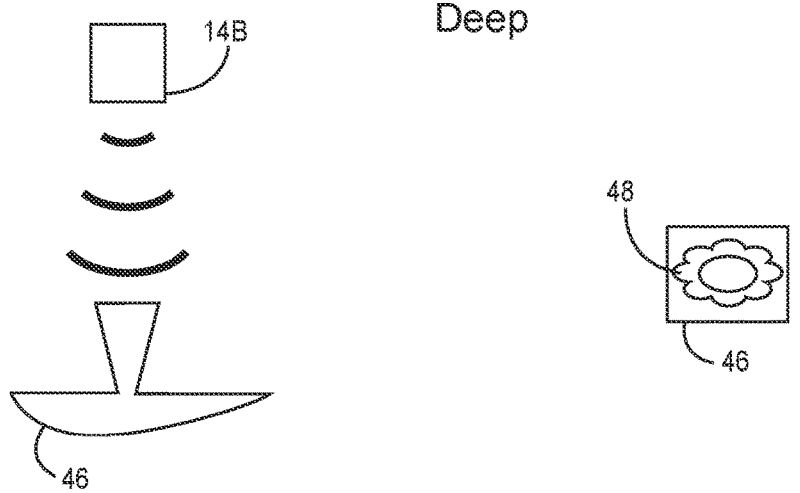
FIG. 8B shows operation of a structured light sensor, according to one implementation.
Figure 8C:
FIG. 8C shows operation of a structed light sensor, according to one implementation.
Figure 8C:
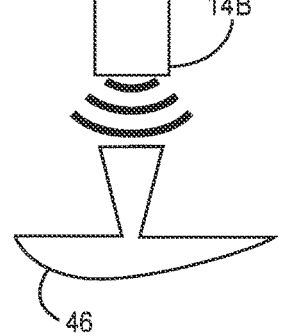
Figure 8C:
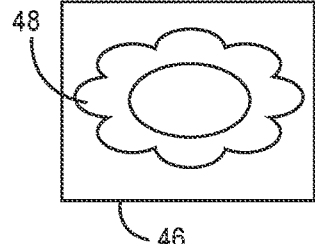

It is understood that the sensor 14B for the furrow target object 46 can include sensors that detect ferrous or magnetic targets as well as structured light. One such example using a structured light array 48 is shown in FIG. 8B and FIG. 8C. In certain implementations of the riding element 46 discussed herein, and as shown in FIG. 8B and FIG. 8C, the structured light array 48 is disposed on the upper surface of the riding element 46 so as to be in optical communication with one or more non-contact sensors 14B, such that the non-contact sensors 14B can be constructed and arranged to measure the distance to the rider 46 via changes in detected size of the array 48. Other implementations are of course possible and will be evident in the further implementations discussed herein.

Figure 9:
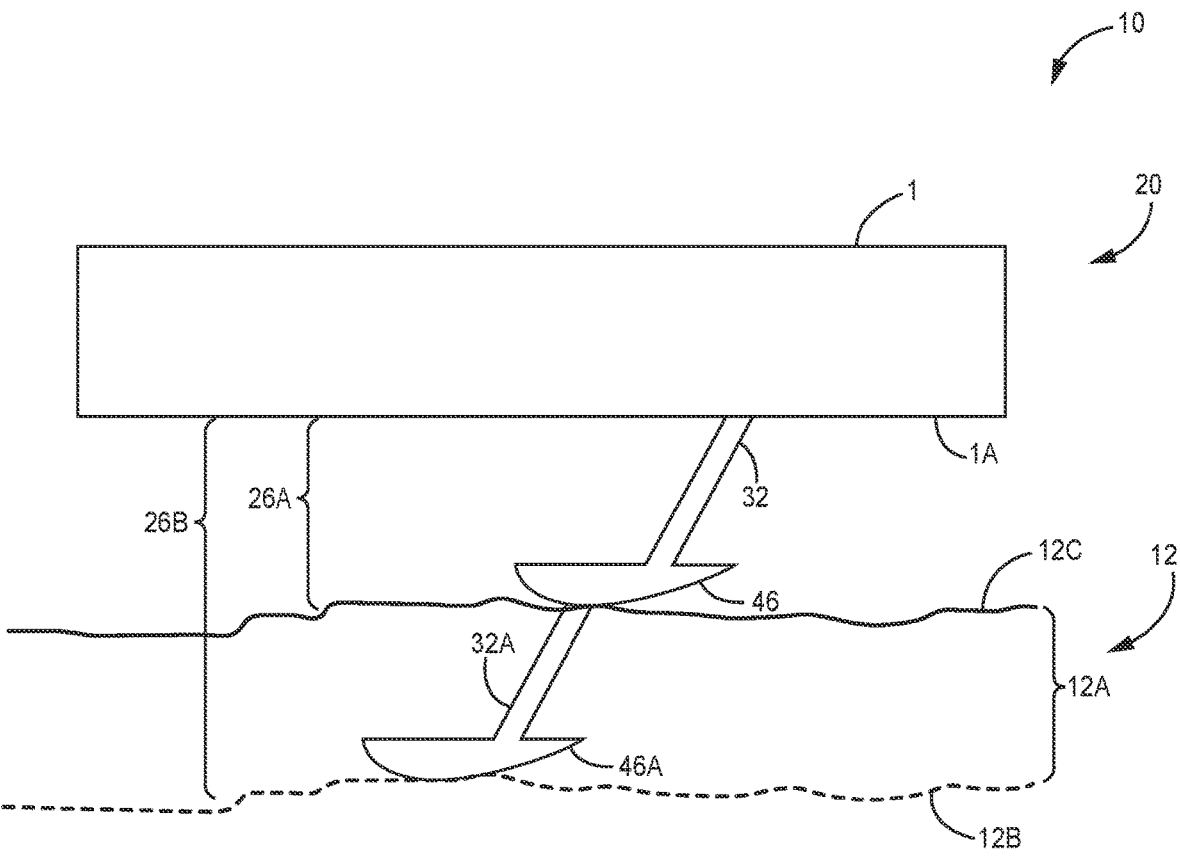
FIG. 9 is a side view of a row unit with a rider and second rider, according to one implementation.

In implementations like that of FIG. 9, the row unit 1 has a rider 46, described further herein. It is understood that in these implementations, the rider 46 can either ride on the soil surface 12C or in the seed furrow 12 or both, and that the monitoring system 20 can be constructed and arranged to use both contact and non-contact distance measuring approaches, such as the rider 46 approach, to assess furrow depth 12A.

The implementation of FIG. 9 has a rider 46 that rides on the surface 12C of the soil. In this implementation, the rider 46 is affixed to the planter row unit 1 through a flexible, rotating, or deflecting support arm 32, and the ground surface distance 26A is measured using one of the contact sensing methods described in relation to FIG. 8A.

In the implementation of FIG. 9, there is a second rider 46A which rides on the bottom 12B of the furrow 12. The second rider 46A according to this implementation is affixed to the first rider 46 through a second flexible, rotating, or deflecting support arm 32A. It is understood that the furrow depth distance 26B is measured using one of the contact sensing methods described above in relation to FIG. 8A, thereby directly measuring the depth of the furrow 12. Other approaches are of course possible.

Figure 10:
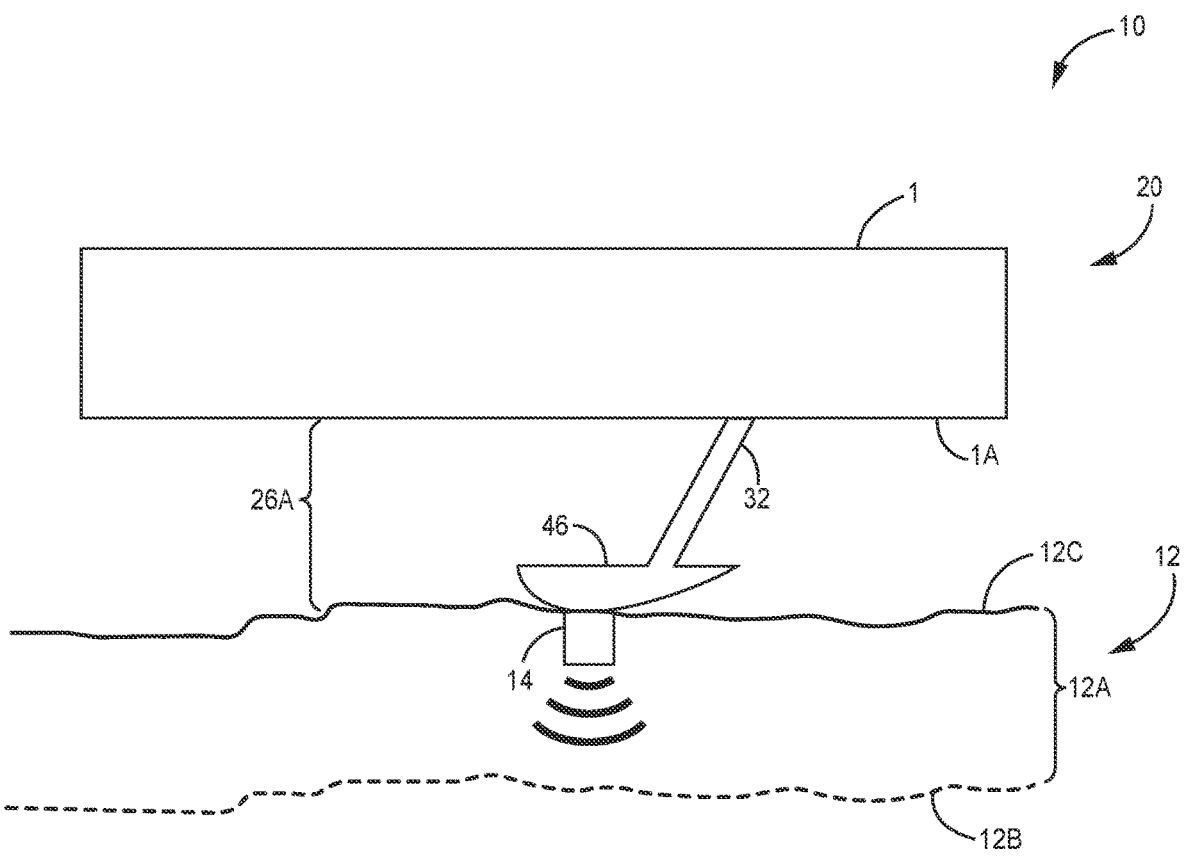
FIG. 10 is a side view of a row unit with a rider and non-contact sensor, according to one implementation.

The monitoring system 20 implementation of FIG. 10 depicts an alternate configuration of the rider 46. In this embodiment, a rider 46 is affixed to the planter row unit 1 through a flexible, rotating, or deflecting support arm 32, the rider 46 being constructed and arranged to assess the ground surface distance 26A.

In the implementation of FIG. 10, the rider 46 includes a non-contact sensor 14 positioned near the seed furrow 12 and oriented in the direction of the bottom 12B, so as to assess furrow depth 12A. The distance from the top of the soil 12C to the bottom 12B of the furrow is thereby measured using one of the non-contact sensing methods already listed, thereby directly measuring the depth of the furrow 12 in these implementations.

Figure 11:
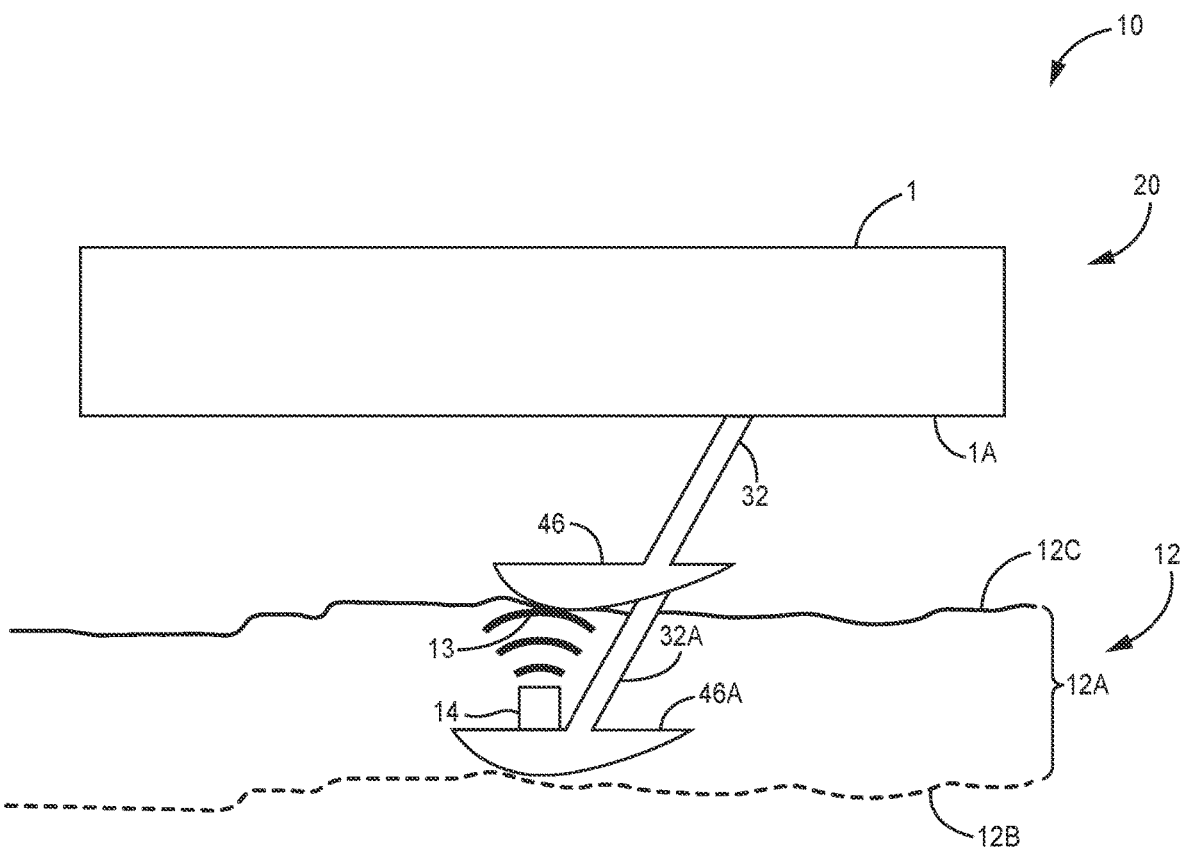
FIG. 11 is a side view of a row unit with two riders and a non-contact sensor, according to one implementation.

FIG. 11 depicts an implementation of the monitoring system 20 having first 46 and second 46A riders and a non-contact sensor 14, with the first 46 and second 46A riders being constructed and arranged as was described in relation to FIG. 9.

In these implementations, the non-contact sensor 14 is constructed and arranged to measure the distance from the furrow rider 46A to the soil rider 46 for determining the depth 12A of the furrow. In alternate implementations, the non-contact sensor configurations can comprise a non-contact sensor 14 disposed on the soil riding member 46 that measures distance to the furrow rider 46A.

In use according to certain of these implementations, the sensor 14 is constructed and arranged to transmit a signal to a receiver 13 on the opposite rider 46, 46A that, accounting for structure, allows calculation of the real-time distance between the riders 46, 46A and therefore the furrow depth 12A.

Figure 12:
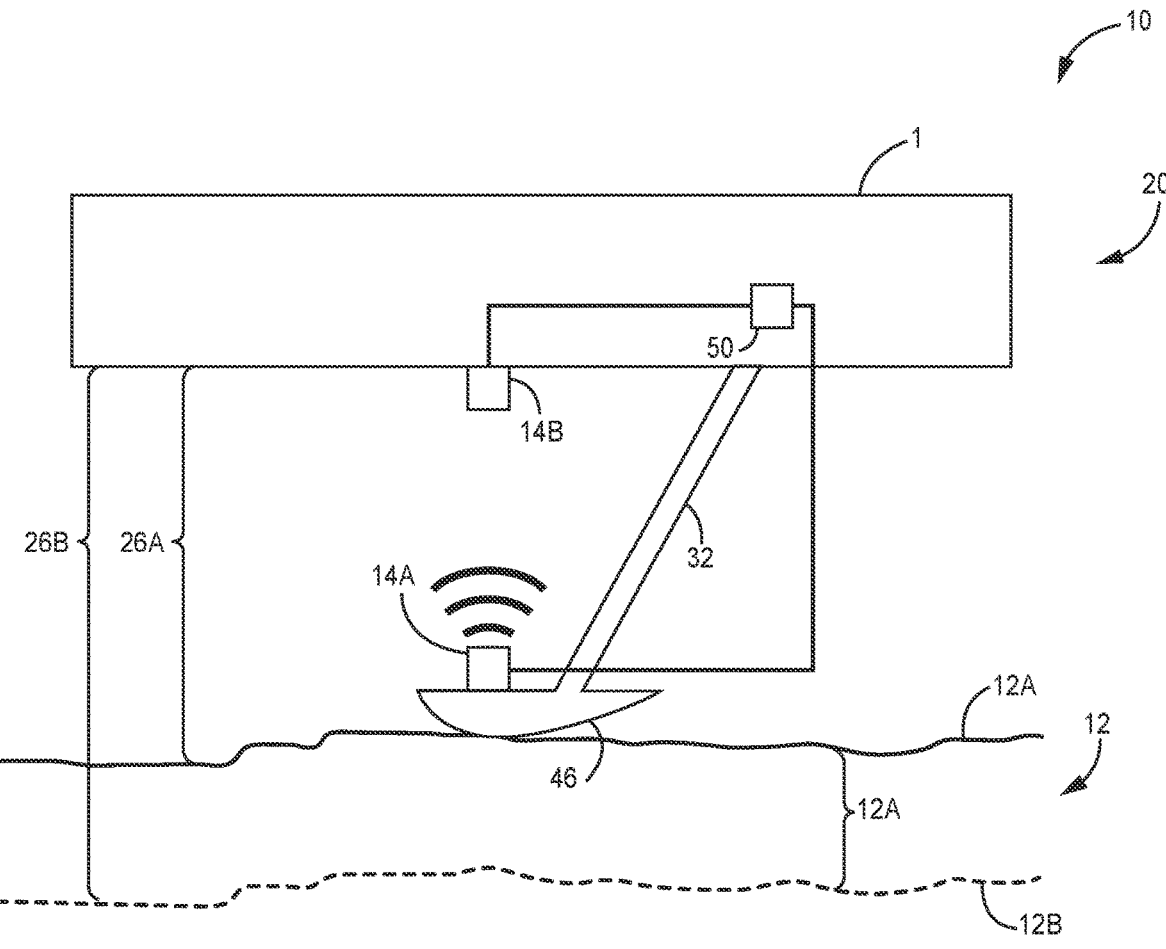
FIG. 12 is a side view of a row unit with two sensors, according to one implementation.

As shown in FIG. 12, first 14A and second 14B sensors are provided that are transmit 14A and receive 14B sensors can be used. A sensor processing unit 50 is provided in these implementations and is constructed and arranged to coordinate the transmission and receipt and establish the distance between the sensors 14A, 14B. Accordingly, in certain implementations, alone or in combination with the other described technologies and approaches to determine any of ground surface distance 26A, furrow depth distance 26B and/or furrow depth 12A. In the implementation of FIG. 12 having a ground rider 46 with a contact sensor, the transmit sensor 14A can be disposed on the rider 46 and the receive sensor 14B disposed on the underside of the row unit 1A. Furrow depth 12A can be calculated through any of the previously-described approaches. For example, 26B is always a fixed row unit dimension—from the receive sensor 14B to the bottom of the seed trench—that does not vary with planting depth. It is understood that ground surface distance 26A varies with planting depth, and therefore, furrow depth 12A is calculated by subtracting ground surface distance 26A from furrow depth distance 26B.

Figure 13:
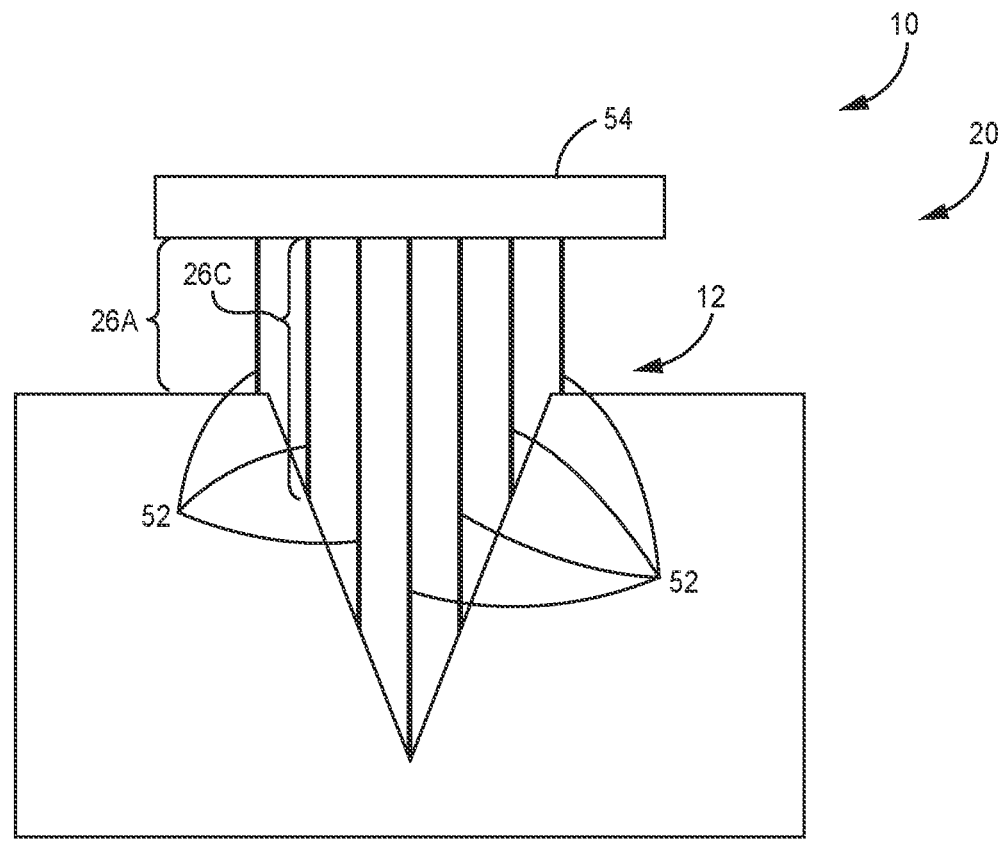
FIG. 13 is a cross-sectional view of a furrow and an array of contact sensors affixed to a sensor unit, according to one implementation.

Certain implementations of the monitoring system 20 comprise a contact sensor array 52 alone or in combination with the other contact- and non-contact-sensing approaches discussed herein. FIG. 13 depicts an array of contact sensors 52 or feelers 52 affixed to a sensor unit 54 which is mounted to the planter row unit (not shown). The feelers 52 are affixed to the sensor unit 54 by flexible, rotating, or deflecting members. In use, according to these implementations, the feelers 52 are positioned orthogonal to the seed furrow 12 and extend down to the soil and furrow level. It is understood that in these implementations, the distance measurement on the feelers 52 is combined into a soil depth profile from which the furrow depth is determined.

In these and other implementations, the depth profile includes a maximum deflection measurement ($F_{max}$) and a minimum deflection measurement ($F_{min}$). In these implementations, $F_{min}$ is established or otherwise determined by measuring the position of one or more feeler sensors 52 with the least amount of deflection. Here, $F_{max}$ is determined by measuring the position of one or more of the feeler sensors 52 with the most deflection. Combined, these deflection measurements ($F_{min}$ and $F_{max}$) are translated to a vertical distance from the sensor unit 54 which becomes the minimum vertical distance ($V_{min}$) and the maximum vertical distance ($V_{max}$). The trench depth is determined by subtracting the minimum vertical distance ($V_{min}$) from the maximum vertical distance ($V_{max}$).

The depth 12A at any point along the furrow 12 profile is thereby measured by subtracting the ground surface distance 26A from the distance at the point of interest 26C, as measured from a shared reference location.

Using the depth of each feeler 52, the monitoring system 20 according to these implementations is able to identify the lowest point in the furrow 12. In various implementations, the monitoring system 20 is able to utilize the lowest point measured, or in the alternative run a curve fit through the variety of measured points to establish the lowest value on the curve. In further implementations, the monitoring system 20 is able to exclude small pockets in the observed furrow profile that would not allow seed placement, for example when the furrow is to shallow and/or narrow, as would be understood by those of skill in the art.

Figure 14:
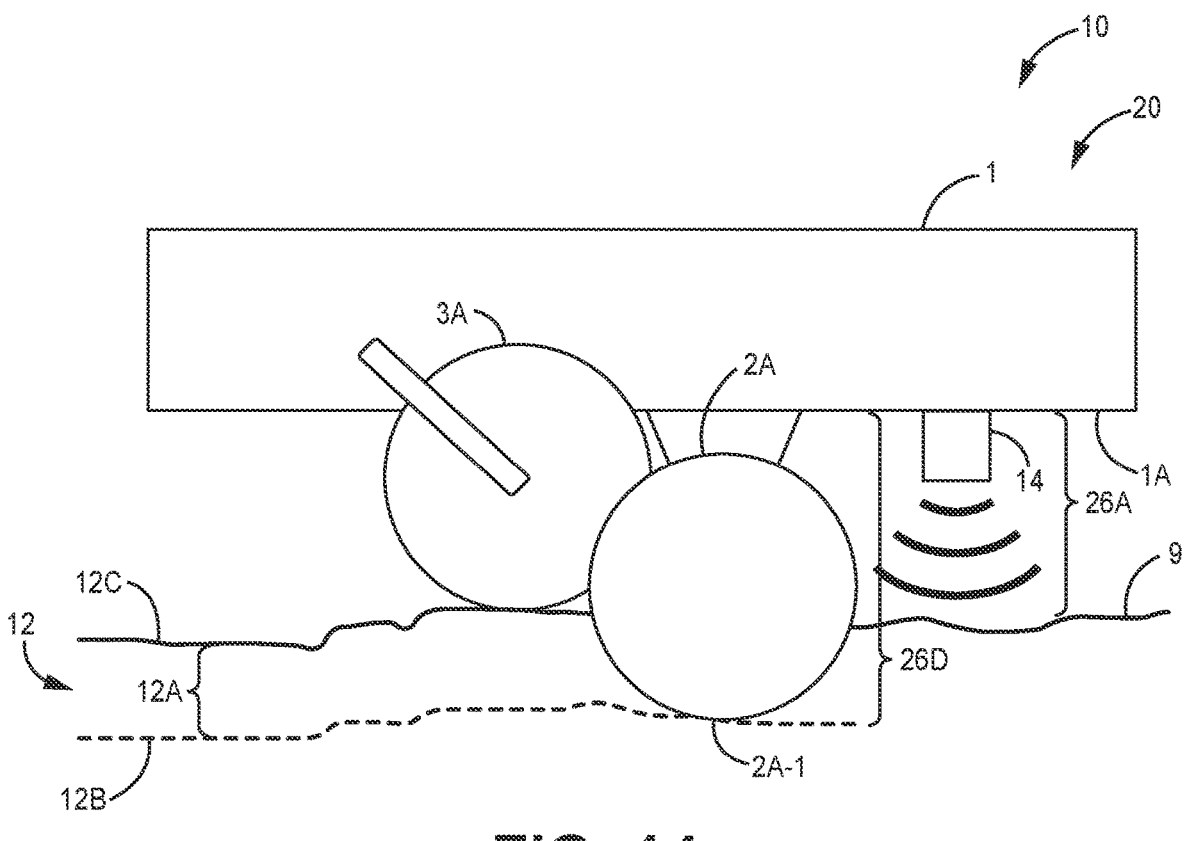
FIG. 14 is a side view of a row unit having non-contact sensor, according to one implementation.

Additional implementations of the monitoring system 20 comprise various alternate sensor 14 placements. In the implementation of FIG. 14, furrow depth 12A is measured by sensing the height of the soil 9 relative to the planter row unit frame (shown generally at 1 and 1A) using a non-contact sensor 14, as has been previously described. In the implementation of FIG. 14, the sensor 14 is mounted adjacent to the opening disk 2A—that is ahead of, behind or otherwise adjacent to the disc 2A—in the forward direction of travel such that ground surface distance 26A is being measured before the seed furrow 12 is opened. It is understood that the known opening disk distance 26D—the distance from the row unit 1 and or sensor 14 to the bottom 2A-1 of the opening disks—is known or can be established by those of skill in the art via mounting location, measurement by calibration or other manual approaches. Accordingly, in these implementations the furrow depth is calculated by the opening disk distance 26D minus the ground surface distance 26A, adjusting for any known constants or variables that may be required and appreciated by those of skill in the art.

Figure 15:
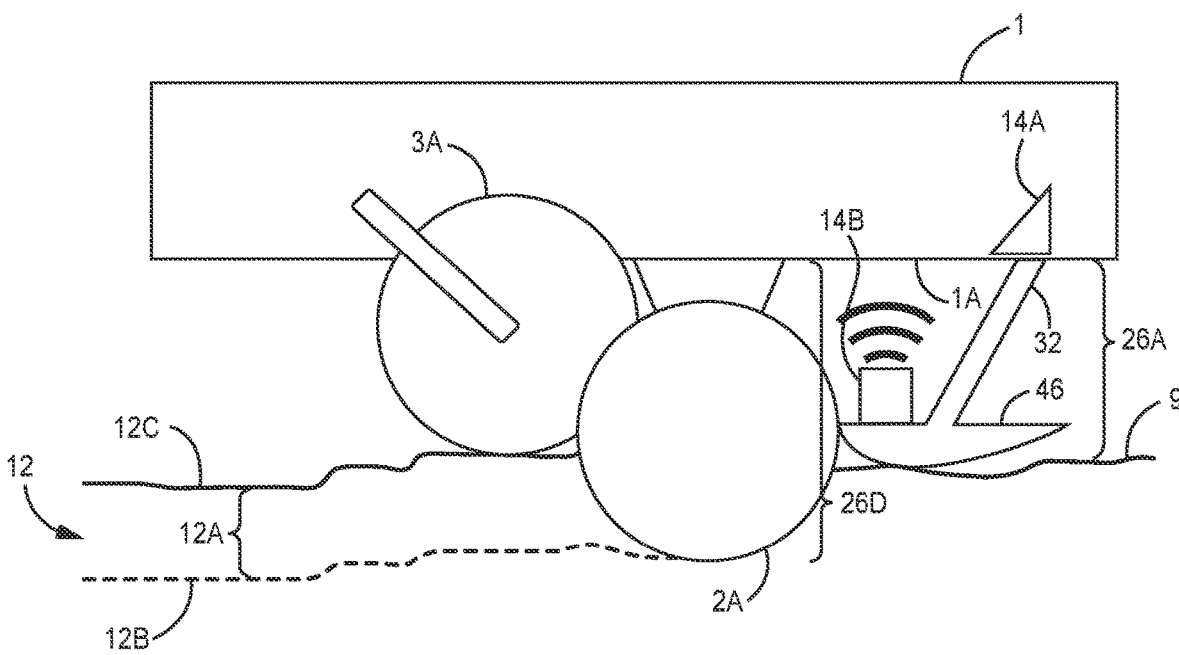
FIG. 15 is a side view of a row unit having a contact rider, according to one implementation.

In the implementation of FIG. 15, a contact rider 46 on a flexible arm 32 is mounted adjacent to the opening disks 2A.

In various implementations, a first sensor 14A—here a contact sensor 14A—can be used to measure the deflection—distance or rotation—of the arm 32 of the soil riding element. In these implementations, the contact sensors 14A used may include: potentiometers, optical encoders, magnetic encoders, Hall Effect sensors, inductive sensors and/or capacitive sensors.

In additional implementations, a distance sensor 14A that measures the deflection of the arm of the soil riding element can measure rotation through use of the radial distance from arm 32 pivot point—where the arm pivots relative to the row unit 1—to the distance sensor 14A. In this way, a rotational measurement is made and calculation of vertical deflection of the rider 46 is identical to the rotational sensor 14A.

It is understood that for a first rotational sensor 14A in operational communication with the soil rider arm 32, the length (radius) of the soil rider arm multiplied by the measured angle of deflection (in radians) determines the radial distance of deflection. In these implementations, it is understood that basic trigonometric principles can be used to yield a vertical distance (or height) of deflection which equates to furrow depth 12A.

In alternate implementations, the rider 46 is replaced with a rolling wheel.

In certain implementations, a second non-contact sensor 14B is constructed and arranged to measure the distance from the bottom of the soil rider 46 (the ground 9) to a defined reference point on the row unit 1, such as the underside 1A of the row unit. It is understood that it is therefore possible to calculate the opening disk distance 26D using known constants, as has been described above.

It is understood that in various of these implementations, the contact sensor 14A and/or non-contact sensor 14B can be used together or in the alternative.

Figure 16:
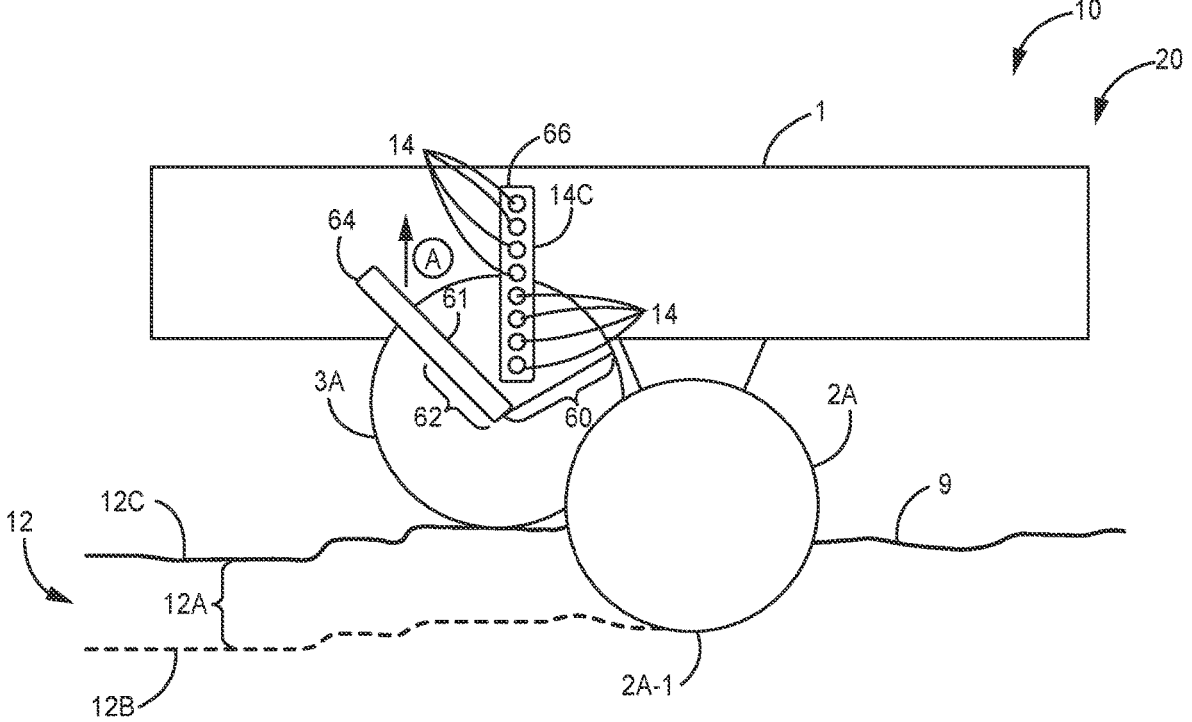
FIG. 16 shows a schematic implementation of the monitoring system, according to one implementation.

FIG. 16 depicts a schematic implementation of the monitoring system 20 where furrow depth 12A is measured by establishing the position of the gauge wheel 3A relative to individual sensors 14 disposed on a sensor array 14C mounted to or otherwise disposed proximal to the planter row unit 1 frame. In various implementations, the sensor(s) 14, 14C used can be optical, laser, capacitive, inductive, radar, ultrasonic, CCD, and/or camera, all of which are non-limiting examples. It is appreciated that further sensors 14 and arrays 14C are contemplated.

In these implementations, the sensor array 14C is positioned so that as the gauge wheel 3A is deflected up (shown by reference arrow A) relative to the planter row unit 1, the relative position of the gauge wheel 3A to the sensor array 14C is determinable by the sensor elements 14 that detect the presence of the gauge wheel 3A. Because the sensor(s) 14C, 14 in these implementations are rigidly mounted to the row unit 1, the vertical distance from each sensor element to the distal point 2A-1 of the opening disks—and therefore the bottom 12B of the furrow 12A—is known based on the mounting location or other manual or predictive measurement, as described above.

It is understood that the one or more of the gauge wheel radius 60, gauge wheel arm 61 radius 62, gauge wheel arm pivot point 64, and sensor mounting point 66 can be used to calculate the vertical deflection of the gauge wheel 3A relative to the planter row unit 1. It is understood that in examples where the vertical deflection measurement is relative to the bottom 2A-1 of the opening disks 2A (and therefore the bottom 12B of furrow), the furrow depth 12A is equal to the vertical deflection. In alternate examples where the vertical deflection measurement is relative to a row unit 1 reference point, the furrow depth 12A is equal to the opening disk 2A position (relative to the reference point) minus the vertical deflection measurement. Other examples are of course possible.

Figure 17:
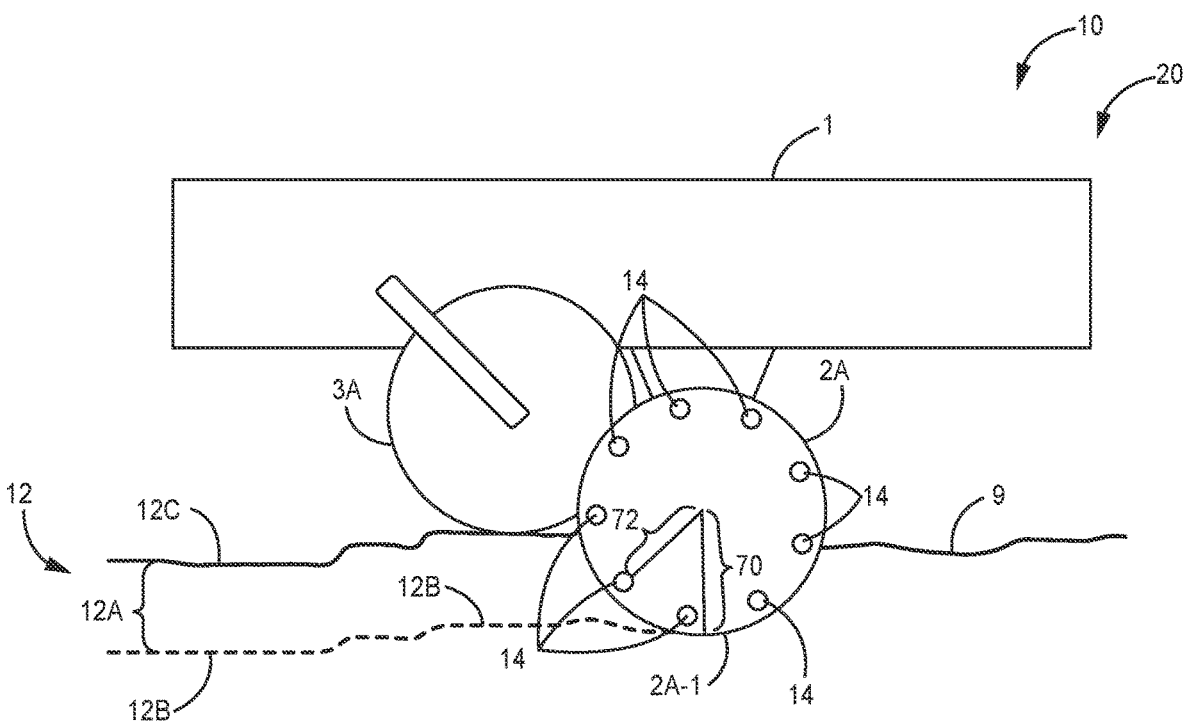
FIG. 17 is a side view of a row unit having sensors disposed on the opening disk, according to one implementation.

In certain alternate implementations, sensors 14 can be disposed on the opening disk 2A, as shown in FIG. 17. That is, in certain of these implementations, sensors 14 are affixed to the opening disks 2A near the edge of those disks so as to approximate the circumference. In these implementations, certain non-limiting examples of possible sensor(s) 14 include optical, laser, capacitive, inductive and ultrasonic sensors, or a combination thereof.

In implementations like that of FIG. 17, these sensors 14 are constructed and arranged to allow detection of the presence or absence of soil. Here, furrow depth 12A is measured by using the travel time—and/or distance—of the sensor 14 elements through the soil 9 to calculate or otherwise approximate furrow depth 12A.

It is understood that the system 20 is constructed and arranged to establish the rotational velocity of the opening disks 2A via the soil/no-soil detection times or intervals measured between sensor(s) 14 and the known angular spacing between sensor(s) 14. It is further understood that any number of sensors 14 can be used, and that the sensors 14 may or may not be adjacent. In certain examples, the furrow depth 12A is measured by using the radius 70 of the opening disks, the radius 72 to the sensors on the opening disks 2A, the time measured for a sensor to traverse the soil, and the rotational velocity of the opening disks 2A. Additional approaches are possible.

Figure 18:
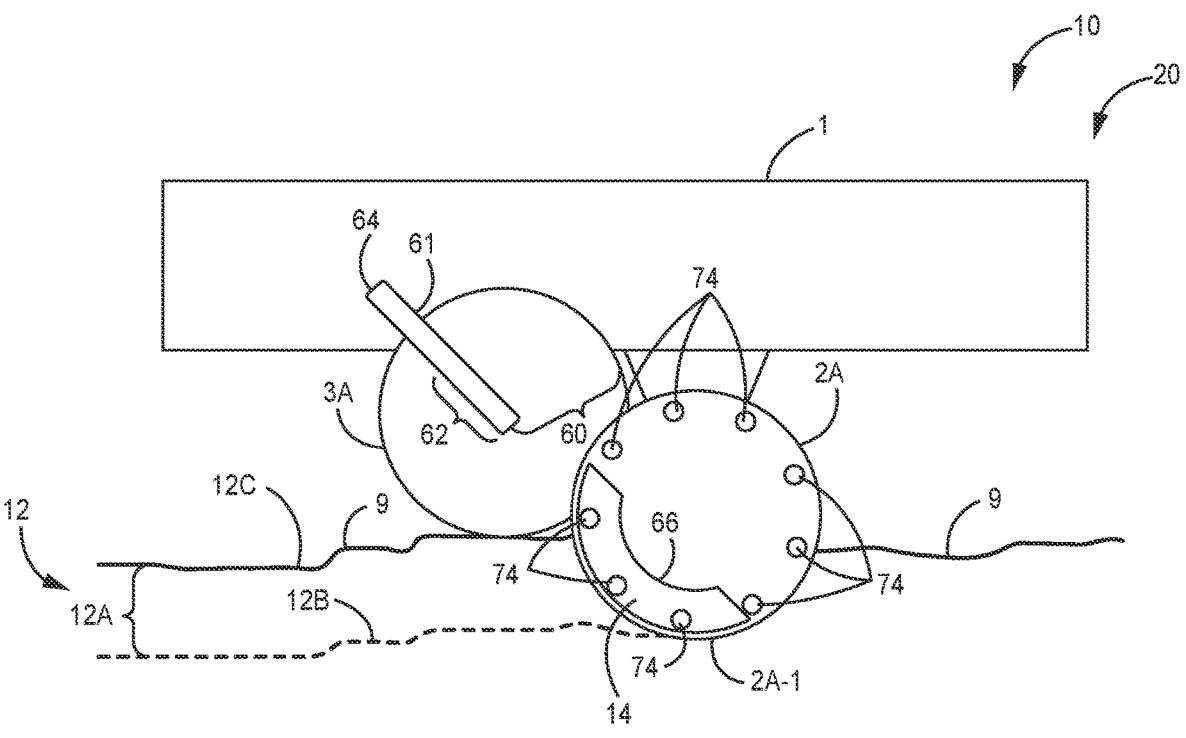
FIG. 18 is a side view of a row unit having ports defined in a side of the opening disk, according to one implementation.

In FIG. 18, ports 74 are defined into a side or sides of the opening disk(s) 2A that are constructed and arranged to allow a sensor 14 inside edge of the opening disk 2A to receive light through the ports 74 and thereby evaluate the presence or absence of soil. In these implementations, the furrow depth 12A is determined by the monitoring system 20 by detecting the top 12C edge of soil 9 relative to the known location of the opening disk 2A. That is, it is understood that by virtue of its mounting being fixed to the planter row unit 1 and the opening disks 2A, the position relative to the bottom 2A-1 of the opening disks 2A is known for each sensor 14 element registering the presence of soil via a port 74.

In alternative embodiments, the same via-port 74 sensing approach is utilized to detect the position of the gauge wheel 3A in relation to the opening disk 2A. Gauge wheel 3A to opening disk 2A relative measurement allows the furrow depth 12A to be determined as follows. Because the sensor 14 is rigidly or otherwise fixedly mounted to the row unit 1, the vertical distance from each sensor 14 to the opening disks 2A—including the bottom 2A-1—and therefore the bottom 12B of the furrow is known, as was previously described. In various implementations, one or more of the gauge wheel radius 60, gauge wheel arm radius 62, gauge wheel arm pivot point 64, and sensor mounting point 66 is used to calculate the vertical deflection of the gauge wheel 3A relative to the planter row unit 1, as has been previously described. That is, if the vertical deflection measurement is relative to the bottom 2A-1 of the opening disks (and therefore the bottom 12B of the furrow), the furrow depth 12A is equal to the vertical deflection. If the vertical deflection measurement is relative to a row unit 1 reference point, the furrow depth 12A is equal to the opening disk 2A position—relative to the reference point—minus the vertical deflection measurement.

Figure 19:
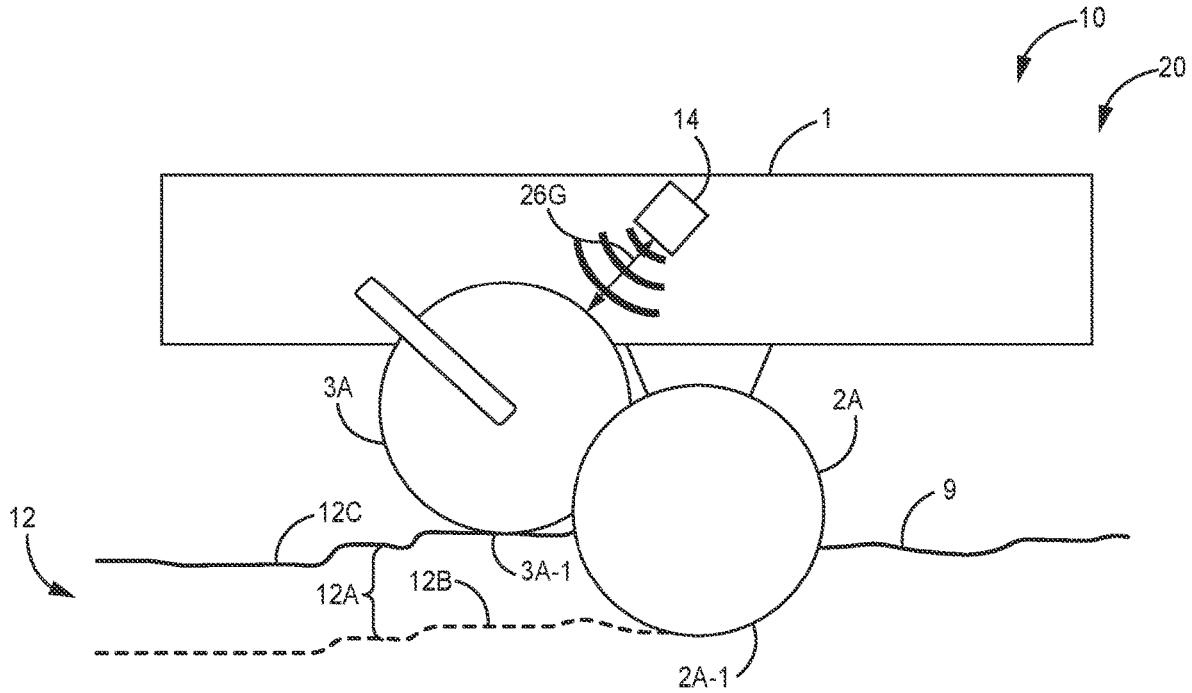
FIG. 19 is a side view of a row unit having a non-contact sensor mounted to the frame, according to one implementation.

In the implementation of FIG. 19, at least one non-contact sensor 14 is rigidly or otherwise fixedly mounted or attached to the planter row unit 1 frame, such as any of the non-contact sensors 14 described above. The non-contact sensor 14 according to these implementations is constructed and arranged to measure the absolute distance to the gauge wheel(s) 3A which can be extrapolated to establish an indirect measure of the overall furrow depth 12A.

That is, the distance (shown at 26G) between the rigidly mounted sensor(s) 14 and the gauge wheel 3A allows the gauge wheel deflection to be measured by the monitoring system 20. Using the gauge wheel radius 60, along with the radius 62 of the gauge wheel arm 61, it is possible for the monitoring system 20 to calculate the vertical distance between the ground-contacting bottom of the gauge wheels 3A-1 and the bottom 2A-1 of the opening disks 2A to estimate furrow depth 12A. It is understood that through the use of multiple sensors 14, the monitoring system 20 can be constructed and arranged to measure gauge wheel deflection from more than one location thereby improving accuracy. Further, using multiple sensors 14 may be needed to increase the rate at which the gauge wheel deflection distance is measured and improve real-time accuracy.

Figure 20:
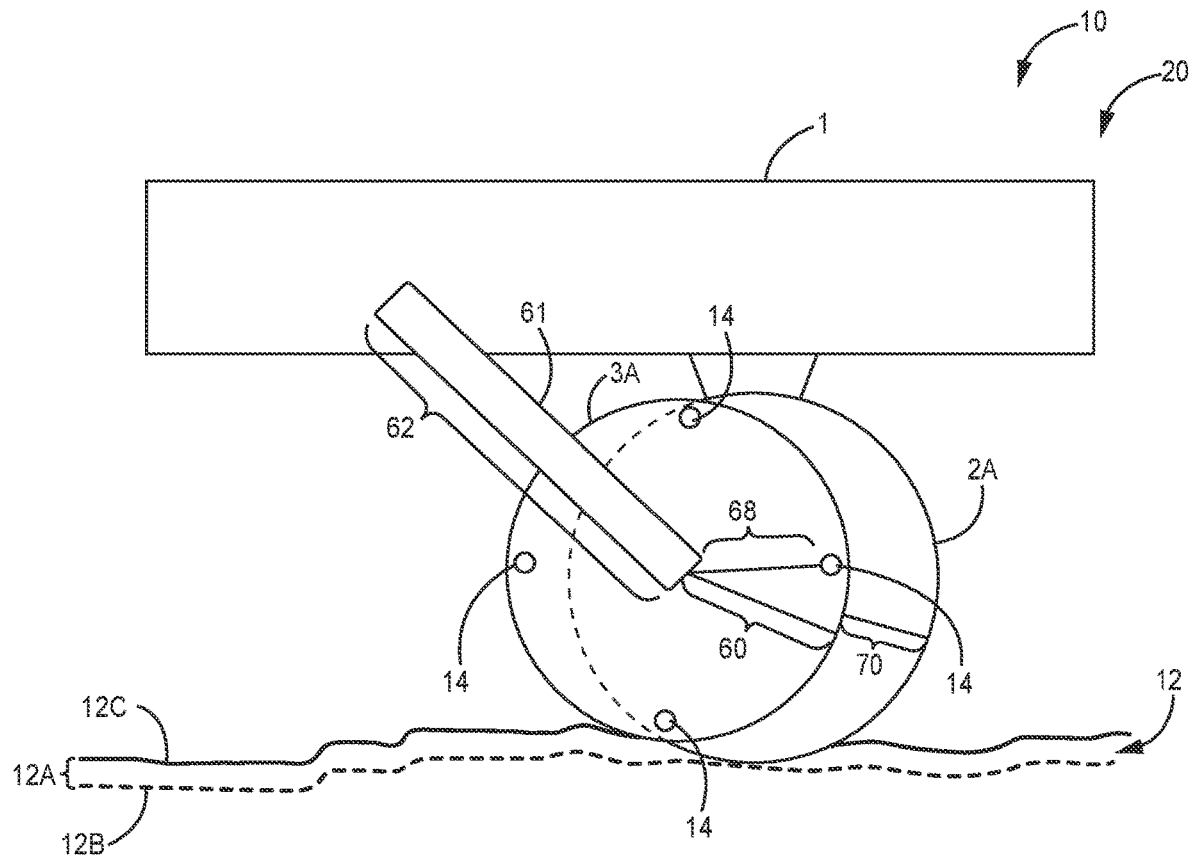
FIG. 20 is a side view of a row unit having sensor disposed about a gauge wheel, according to one implementation.

Various implementations of the system 10 monitoring system 20 have gauge wheel circumference sensors 14. As shown in FIG. 20, there are contact or non-contact sensors 14 disposed about the gauge wheel 3A. These sensors 14 are constructed and arranged to detect the presence or absence of the opening disk 2A at any given point around the gauge wheel 3A during rotation. For example, gauge wheel rotational velocity is determined by the presence or absence of the observed disk, with the detection time measured between sensor elements and the angular spacing between sensors 14. The sensors 14 used to measure rotational velocity may or may not be adjacent. Other sensor 14 configurations are of course possible.

Figure 21:
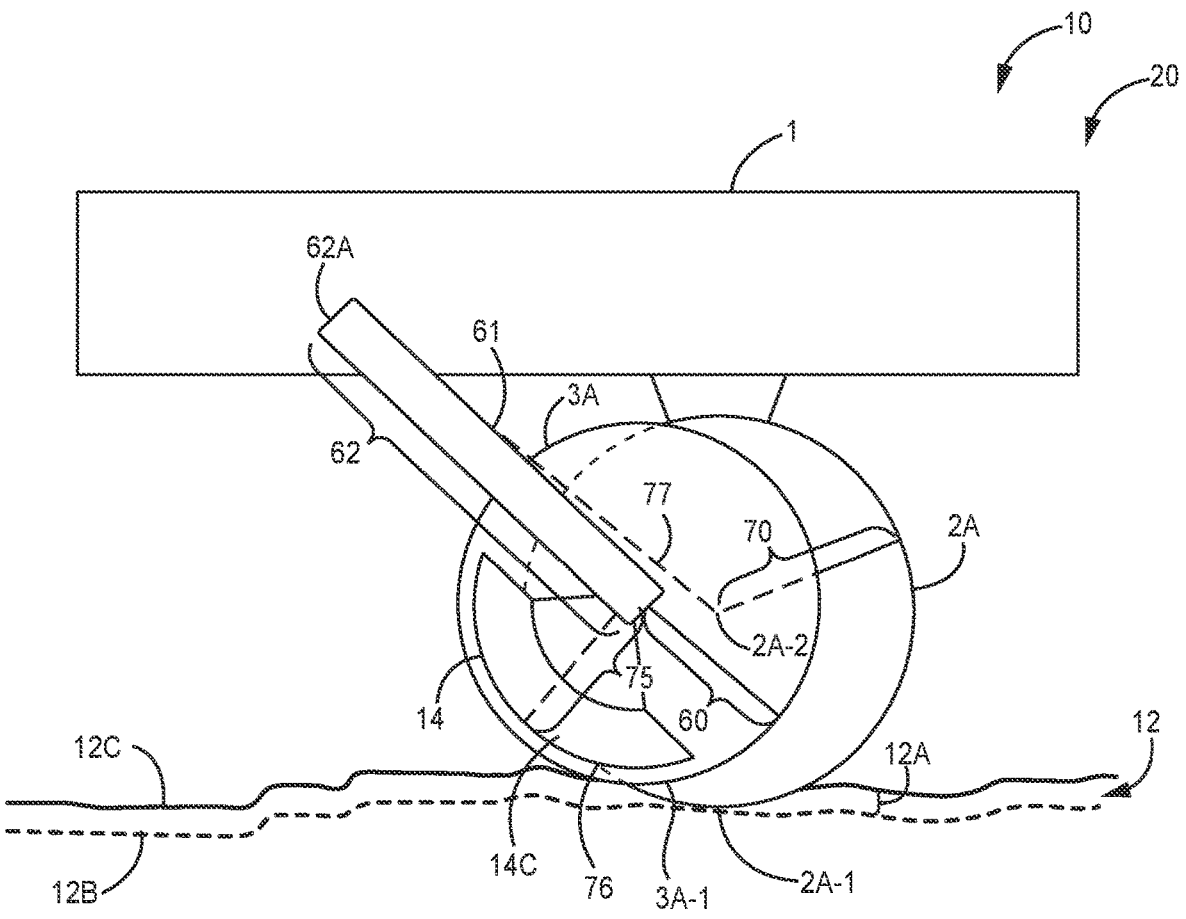
FIG. 21 is a side view of a row unit having an array of sensor to detect the relative position of the gauge wheel, according to one implementation.

The implementation of FIG. 21 has an alternate sensor 14 element, which may include an array 14C of sensors to detect the relative position of the gauge wheel 3A to the opening disk 2A. The sensor 14 according to these implementations is affixed or otherwise operationally coupled to the gauge wheel arm 61 so that its position relative to the gauge wheel arm 61 is fixed. In use, the monitoring system 20 measures the position of the gauge wheel 3A relative to the opening disk 2A and calculates the furrow depth. That is, the sensors 14/array 14C provide a measured position of the element in relation to the opening disks 2A, allowing for the deduction of the furrow depth as previously described.

In certain of these, the sensors 14 are positioned along a portion of the circumference of the gauge wheel 3A. Since the relative position of the openers to the gauge wheels 3A changes as the furrow depth changes, detecting and measuring this relative position determines the deflection of the gauge wheel 3A and the furrow depth 12A.

In various implementations like those of FIGS. 20 and 21, the system 10 and monitoring system 20 can utilize one or more of the following parameters to calculate the furrow depth: rotational velocity of the gauge wheels 3A, gauge wheel radius 60, sensor radius 68, gauge wheel arm radius 62, opening disk radius 70 and/or the distance from gauge wheel arm pivot point to center of opening disk 74. This list of measurements is simply illustrative and not exhaustive—other relevant measurements are possible, as would be understood by those of skill in the art.

In the implementation of FIG. 21, proximity sensors 14 in the sensor array 14C are constructed and arranged so as to detect the proximal presence or absence of the opening disc 2A. It is understood that in these implementations, the binary presence/absence thresholds and tolerances can be adjusted as needed.

In these implementations, the system 10 uses this proximity detection to determine the position of the gauge wheel 3A relative to the opening disc 2A. Proximity sensing along the sensor radius 75 allows determination of at least one intersection point 76 between the circle defined by the opening disc 2A and a circle inside the gauge wheel 3A with radius equal to sensor radius 75.

It is understood that given the gauge wheel arm length 62 and the distance from gauge wheel arm pivot 62A to the center 2A-2 of the opening disk 2A, it is possible to determine angular deflection of the gauge wheel arm 62 relative to the vector (shown at line 77) from gauge wheel arm pivot 62A to the opening disk center 2A-2. This angular distance translates to a vertical distance to the bottom 3A-1 of the gauge wheel 3A, which is subtracted from the vertical distance to the bottom 2A-1 of the opening disk 2A to determine trench depth 12A.

In the implementation of FIG. 21, it is also possible to determine trench depth via a calibrated or setpoint depth value for each of the sensors in the array 14C. That is, in these implementations, the position of the gauge wheel 3A relative to the opening disk 2A can be used to determine which—if any—sensors in the array 14C are detecting the circumferential edge of the opening disk 2A and which are not. Accordingly, it is understood that changing the position of the gauge wheel 3A alters which of these sensors detects the edge of the opening disk 2A. Therefore, if the measured depth 12A is either calibrated or set to the sensors that are detecting the opening disk 2A at a given depth, trench depth 12A can be determined during operation by correlating the detecting sensors to their calibrated and/or set depth values.

It is known that during planting, the gauge wheels 3A and opening disks 2A throw soil and residue, thus making that area very difficult for any kind of sensing. Therefore, for embodiments where the sensors 14 are positioned in this area, a shield 80 or shroud may be needed to protect sensors measuring the distance, as is shown in FIG. 22.

Figure 22:
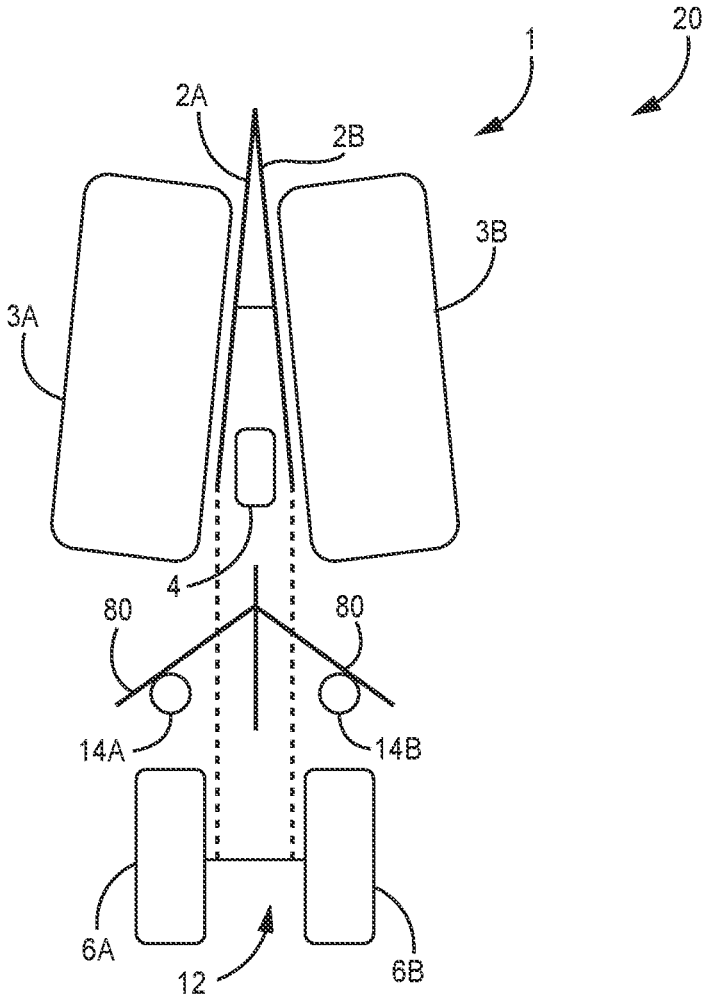
FIG. 22 is a top view of a row unit having a shield, according to one implementation.

That is, in the implementation of FIG. 22, a shield 80 (or shroud) protects the sensors 14 from the soil and residue being thrown by the opening disks 2A, 2B and gauge wheels 3A, 3B. The shield 80 and sensors 14 are rigidly mounted to the planter row unit 1 frame so that a relative measurement can be made from the sensor 14 to the ground 9, allowing furrow depth to be measured, as is described above. The distance measured from soil to ground for each sensor may be averaged. The vertical distance from the sensors to the bottom of the opening disks is fixed because the sensor and shield are rigidly mounted to the row unit frame, which includes the opening disks. This known distance is determined by manual measurement or a calibration procedure. Furrow depth is determined by subtracting the sensor-to-soil distance from the known sensor-to-opener (bottom) distance.

The calibration procedure may be done by affixing a plane horizontally in both directions to the row unit so that the plane is either level to the bottom of the opening disks or a known vertical distance from the plane that is level to the opening disks. The sensors measure the vertical distance to the known plane to determine the sensor-to-opener distance. This measurement is stored in non-volatile memory so it can be used to calculate furrow depth when the unit is operational.

Although the disclosure has been described with reference to preferred embodiments, persons skilled in the art will recognize that changes may be made in form and detail without departing from the spirit and scope of the disclosed apparatus, systems and methods.

What is claimed is:

1. A row unit downforce system comprising:
(a) a downforce actuator in operational communication with the row unit and constructed and arranged to apply supplemental downforce to the row unit and opening disks;
(b) a monitoring system comprising at least one furrow depth sensor constructed and arranged to generate a furrow depth value, the at least one furrow depth sensor comprising:
(i) a first sensor disposed on the row unit configured to measure a distance between the first sensor and a ground surface; and
ii) a second sensor disposed on the row unit configured to measure a distance between the second sensor and a target object; and
(c) a control system module,
wherein the difference between the distances measured by the first sensor and the second sensor is the furrow depth value and wherein the control system module is constructed and arranged to generate actuator command signals in response to the furrow depth value.

2. The row unit downforce system of claim 1, further comprising a gauge wheel load sensor in operational communication with the control system module.

3. The row unit downforce system of claim 2, further comprising a downforce control system in operational communication with the control system module and constructed and arranged to generate actuator command signals for transmission and operation of the downforce actuator.

4. The row unit downforce system of claim 3, wherein the downforce control system comprises at least one control selected from the group consisting of a proportional-integral-derivative control, a machine learning control, a predictive model control and a lookup table.

5. The row unit downforce system of claim 3, wherein the downforce control system utilizes gauge wheel load and furrow depth to modify applied downforce.

6. The row unit downforce system of claim 5, wherein applied downforce is dynamically adjusted.

7. The row unit downforce system of claim 3, wherein the downforce control system utilizes gauge wheel load and furrow depth to dynamically adjust applied downforce.

8. The row unit downforce system of claim 1, wherein the second sensor is a structured light sensor.

9. An agricultural row unit comprising:
(a) a row unit body;
(b) a target object in communication with the row unit body via a support arm and in direct contact with the bottom of a seed trench;
(c) a first sensor fixedly mounted to the row unit body, configured to measure the distance between the first sensor and ground surface; and
(d) a second sensor rigidly mounted to the row unit body, configured to measure the distance between the second sensor and the target object,
wherein actual seed trench depth is determined from a difference in the distances measured by the first sensor and the second sensor.

10. The row unit of claim 9, wherein the target object is a rider.

11. The row unit of claim 9, wherein the support arm is a seed firmer.

12. The row unit of claim 9, wherein the second sensor is a non-contact sensor.

13. The row unit of claim 9, wherein the second sensor is a magnetic sensor.

14. The row unit of claim 9, wherein the second sensor is a structured light sensor and the target object is a light array.

15. A seed trench monitoring system comprising:
(a) a first sensor disposed on a row unit body configured to measure a distance between the first sensor and a ground surface;
(b) a second sensor disposed on the row unit body configured to measure a distance between the second sensor and a target object in direct communication with a bottom of the seed trench; and
(c) a controller configured to calculate actual furrow depth from the distances measured by the first sensor and the second sensor,
wherein the actual furrow depth is compared to set furrow depth, and wherein any difference in actual furrow depth and set furrow depth is utilized by the seed trench monitoring system to generate actuator command signals to modify applied downforce.

16. The seed trench monitoring system of claim 15, wherein applied downforce is dynamically adjusted.

17. The seed trench monitoring system of claim 15, wherein the target object is a light array, and the second sensor is a structed light sensor.

18. The seed trench monitoring system of claim 15, wherein the set furrow depth is dynamically adjusted.

19. The seed trench monitoring system of claim 15, wherein the target object is located on a seed firmer.

20. The seed trench monitoring system of claim 15, further comprising a gauge wheel load sensor in communication with the controller, wherein the actuator command signals are generated in response to gauge wheel load values and actual furrow depth.

* * * * *